(12) United States Patent
Hasegawa

(10) Patent No.: US 11,889,207 B2
(45) Date of Patent: Jan. 30, 2024

(54) SOLID-STATE IMAGING ELEMENT, IMAGING DEVICE, AND METHOD FOR CONTROLLING SOLID-STATE IMAGING ELEMENT

(71) Applicant: SONY SEMICONDUCTOR SOLUTIONS CORPORATION, Kanagawa (JP)

(72) Inventor: Yasumasa Hasegawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 116 days.

(21) Appl. No.: 17/615,261

(22) PCT Filed: Feb. 25, 2020

(86) PCT No.: PCT/JP2020/007303
§ 371 (c)(1),
(2) Date: Nov. 30, 2021

(87) PCT Pub. No.: WO2020/250494
PCT Pub. Date: Dec. 17, 2020

(65) Prior Publication Data
US 2022/0224846 A1    Jul. 14, 2022

(30) Foreign Application Priority Data
Jun. 10, 2019 (JP) .................. 2019-107768

(51) Int. Cl.
*H04N 25/40* (2023.01)
*H04N 25/59* (2023.01)
*H04N 25/704* (2023.01)

(52) U.S. Cl.
CPC ............. *H04N 25/40* (2023.01); *H04N 25/59* (2023.01); *H04N 25/704* (2023.01)

(58) Field of Classification Search
CPC ...... H04N 25/40; H04N 25/59; H04N 25/704; H04N 23/611; H04N 23/617;
(Continued)

(56) References Cited

U.S. PATENT DOCUMENTS 6,847,397 B1 *   1/2005   Osada .................. H04N 25/135
                                                              348/E9.01
2002/0097324 A1 *  7/2002  Onuki ................ H04N 23/6811
                                                              348/208.99
(Continued)

FOREIGN PATENT DOCUMENTS

EP     3349359 A1    7/2018
EP     3512193 A1    7/2019
(Continued)

OTHER PUBLICATIONS

International Search Report and Written Opinion of PCT Application No. PCT/JP2020/007303 dated May 12, 2020, 10 pages of ISRWO.
(Continued)

*Primary Examiner* — Nhan T Tran
(74) *Attorney, Agent, or Firm* — CHIP LAW GROUP

(57) ABSTRACT

The computation time in a solid-state imaging element that performs a convolution operation on image data is shortened and the power consumption is reduced. A plurality of pixels are arranged in a two-dimensional lattice pattern in a pixel array unit. A coefficient holding unit holds a predetermined weighting coefficient correlated with each of a pixel of interest among the plurality of pixels and a predetermined number of adjacent pixels adjacent to the pixel of interest. A scanning circuit performs control so that the adjacent pixel generates an amount of charge corresponding to the weighting coefficient correlated with the adjacent pixel and transfers the charge to the pixel of interest and performs control so that the pixel of interest generates an amount of charge
(Continued)

corresponding to the weighting coefficient correlated with the pixel of interest and accumulates the charge together with the transferred charge.

12 Claims, 32 Drawing Sheets

(58) Field of Classification Search
CPC .... H04N 23/667; H04N 25/42; H04N 25/772; G06N 3/045; G06V 10/7515; G06V 10/955; G06V 10/443
See application file for complete search history.

(56) References Cited

U.S. PATENT DOCUMENTS

| | | | |
|---|---|---|---|
| 2015/0181108 A1* | 6/2015 | Endo | ................ H04N 25/134 348/345 |
| 2016/0029000 A1* | 1/2016 | Lenz | ................ G02B 21/367 348/239 |
| 2018/0198994 A1 | 7/2018 | Cardinaux et al. | |
| 2019/0228497 A1 | 7/2019 | Muramatsu et al. | |

FOREIGN PATENT DOCUMENTS

| | | | | |
|---|---|---|---|---|
| JP | 2010-256776 A | | 11/2010 | |
| JP | 2013-009172 A | | 1/2013 | |
| JP | 2013009172 A | * | 1/2013 | ............. H04N 5/232 |
| JP | 2019145856 A | * | 8/2019 | ............. G03B 11/00 |
| WO | 2018/047618 A1 | | 3/2018 | |

OTHER PUBLICATIONS

Course Website, "CS231n Convolutional Neural Networks for Visual Recognition", Apr. 8, 2019, 26 pages.

* cited by examiner

FIG. 3

|  | (j-1)TH COLUMN | j-TH COLUMN | (j+1)TH COLUMN |
|---|---|---|---|
| (i-1)TH ROW | $w_0$ | $w_1$ | $w_2$ |
| i-TH ROW | $w_3$ | $w_4$ | $w_5$ |
| (i+1)TH ROW | $w_6$ | $w_7$ | $w_8$ |

0-TH LAYER    FIRST LAYER    SECOND LAYER

SOLID-STATE IMAGING ELEMENT, IMAGING DEVICE, AND METHOD FOR CONTROLLING SOLID-STATE IMAGING ELEMENT

CROSS REFERENCE TO RELATED APPLICATIONS

This application is a U.S. National Phase of International Patent Application No. PCT/JP2020/007303 filed on Feb. 25, 2020, which claims priority benefit of Japanese Patent Application No. JP 2019-107768 filed in the Japan Patent Office on Jun. 10, 2019. Each of the above-referenced applications is hereby incorporated herein by reference in its entirety.

TECHNICAL FIELD

The present technology relates to a solid-state imaging element. More specifically, the present invention relates to a solid-state imaging element that performs image processing, an imaging device, and a control method for the solid-state imaging element.

BACKGROUND ART

Conventionally, a convolutional neural network (CNN) has been used for the purpose of improving recognition accuracy in image recognition and voice recognition. CNN is a process of executing a convolutional operation on input data using a matrix in which weighting coefficients of N rows×N columns (N is an integer) called kernels (or filters) are arranged for each of a predetermined number of stages of layers. In image recognition, CNN is mainly performed using a kernel having a minimum size of 3 rows×3 columns (see, for example, NPL 1). This is because the receptive fields of kernels having a size larger than 3 rows×3 columns can be covered by increasing the number of layers, and in neural networks, non-linear operations are performed in each layer, so it is more expressive to repeat convolution with the minimum number of parameters.

CITATION LIST

Non Patent Literature

[NPL 1] "Convolutional Neural Networks (CNNs/ConvNets)", [online] [Searched on Apr. 8, 2019], Internet (URL: http://cs231n.github.io/convolutional-networks/)

SUMMARY

Technical Problem

In the above-mentioned conventional technique, the image recognition accuracy is improved using the result of the convolution operation performed in a large number of layers as a feature amount. However, since the convolution operation is executed in order for respective pixels, there is a problem that if a certain number of layers are required to obtain sufficient image recognition accuracy, the amount of computation increases as the number of pixels increases under the certain number of layers, the computation time increases, and the power required for the calculation increases.

The present technology has been made in view of such the above-described problem and an object thereof is to shorten the computation time and reduce the power consumption in a solid-state imaging element that performs a convolution operation on image data.

Solution to Problem

The present technology has been made to solve the above-described problems, and a first aspect thereof provides a solid-state imaging element and a method of controlling the same, the solid-state imaging element including: a pixel array unit in which a plurality of pixels are arranged in a two-dimensional lattice pattern; a coefficient holding unit that holds a predetermined weighting coefficient correlated with each of a pixel of interest among the plurality of pixels and a predetermined number of adjacent pixels adjacent to the pixel of interest; and a scanning circuit that performs control so that the adjacent pixel generates an amount of charge corresponding to the weighting coefficient correlated with the adjacent pixel and transfers the charge to the pixel of interest and performs control so that the pixel of interest generates an amount of charge corresponding to the weighting coefficient correlated with the pixel of interest and accumulates the charge together with the transferred charge. This has the effect that a signal in which the amounts of charge corresponding to the weighting coefficients of the pixel of interest and the adjacent pixels are added is generated.

Further, in the first aspect, the plurality of pixels may be arranged in a two-dimensional lattice pattern. This has the effect that a signal in which the amounts of charge corresponding to the weighting coefficients of nine pixels are added is generated.

Further, in the first aspect, the plurality of pixels may be arranged in a honeycomb pattern. This has the effect that a signal in which the amounts of charge corresponding to the weighting coefficients of seven pixels are added is generated.

Further, in the first aspect, each of the plurality of pixels may include: a photoelectric conversion element that generates the charge by photoelectric conversion; a charge holding portion that holds the charge; an internal transfer transistor that internally transfers the charge from the photoelectric conversion element to the charge holding portion; and the predetermined number of external transfer transistors that externally transfer the charge from the photoelectric conversion element to surrounding pixels among the plurality of pixels. This has the effect that a signal in which the externally transferred charge is added to the internally transferred charge is generated.

Further, in the first aspect, the charge holding portion may be a capacitor. This has the effect that a signal corresponding to the potential of the capacitor is generated.

Further, in the first aspect, the charge holding portion may be a floating diffusion layer. This has the effect that a signal corresponding to the potential of the floating diffusion layer is generated.

Further, in the first aspect, the scanning circuit may cause the predetermined number of adjacent pixels and the pixel of interest to start generating of the charge at different timings. This has the effect that the pixel signal is generated by the pixel of interest and the adjacent pixels whose exposure is started at different timings.

Further, in the first aspect, the scanning circuit may cause the predetermined number of adjacent pixels and the pixel of interest to start generating of the charge at the same timing.

This has the effect that a pixel signal is generated by the pixel of interest and the adjacent pixels whose exposure is started at the same time.

Further, in the first aspect, the pixel array unit may be divided into a plurality of windows having a predetermined size, and each of the plurality of windows outputs a pixel signal corresponding to the statistic of the amount of the charge accumulated in each of the pixels in the window. This has the effect that the number of pieces of data is reduced.

Further, on the first aspect, the solid-state imaging element may further include an image processing unit that performs a predetermined convolution operation on the image data output by the pixel array unit. This has the effect that CNN is realized.

A second aspect of the present technology provides an imaging device including: a pixel array unit in which a plurality of pixels are arranged in a two-dimensional lattice pattern; a coefficient holding unit that holds a predetermined weighting coefficient correlated with each of a pixel of interest among the plurality of pixels and a predetermined number of adjacent pixels adjacent to the pixel of interest; a scanning circuit that performs control so that the adjacent pixel generates an amount of charge corresponding to the weighting coefficient correlated with the adjacent pixel and transfers the charge to the pixel of interest and performs control so that the pixel of interest generates an amount of charge corresponding to the weighting coefficient correlated with the pixel of interest and accumulates the charge together with the transferred charge; and an image processing unit that performs predetermined processing on the image data output by the pixel array unit. This has the effect that predetermined processing is executed on the image data composed of the pixel signal in which the amounts of charge corresponding to the weighting coefficients are added.

A third aspect of the present technology provides an imaging device including: a pixel array unit in which a plurality of pixels are arranged in a two-dimensional lattice pattern; a coefficient holding unit that holds a predetermined weighting coefficient correlated with each of a pixel of interest among the plurality of pixels and a predetermined number of adjacent pixels adjacent to the pixel of interest; an actuator that changes positions of the plurality of pixels to positions different from predetermined initial positions in pixels units; and a scanning circuit that performs control so that each of the plurality of pixels at the initial positions generates an amount of charge corresponding to the weighting coefficient corresponding to the pixel of interest and performs control so that, each time the position of the pixel array unit is changed, an amount of charge corresponding to the weighting coefficient corresponding to the adjacent pixel related to the changed position is generated. This has the effect that by changing the positions in pixel units, a signal in which the amounts of charge corresponding to the weighting coefficients of the pixel of interest and the adjacent pixels are added is generated.

BRIEF DESCRIPTION OF DRAWINGS

FIG. 3 is a diagram illustrating an example of a kernel according to the first embodiment of the present technology.

DESCRIPTION OF EMBODIMENTS

Hereinafter, modes for carrying out the present technique (hereinafter referred to as embodiments) will be described. The description will be made in the following order.
1. First Embodiment (Example in which pixel generates amount of charge corresponding to weighting coefficient)
2. Second Embodiment (Example in which pixels arranged in honeycomb form generate amount of charge corresponding to weighting coefficient)
3. Third Embodiment (Example in which pixel generates amount of charge corresponding to weighting coefficient each time position is changed in pixel units)
4. Application Example to Moving Body 1. First Embodiment

[Configuration of Imaging Device]

Figure 1:
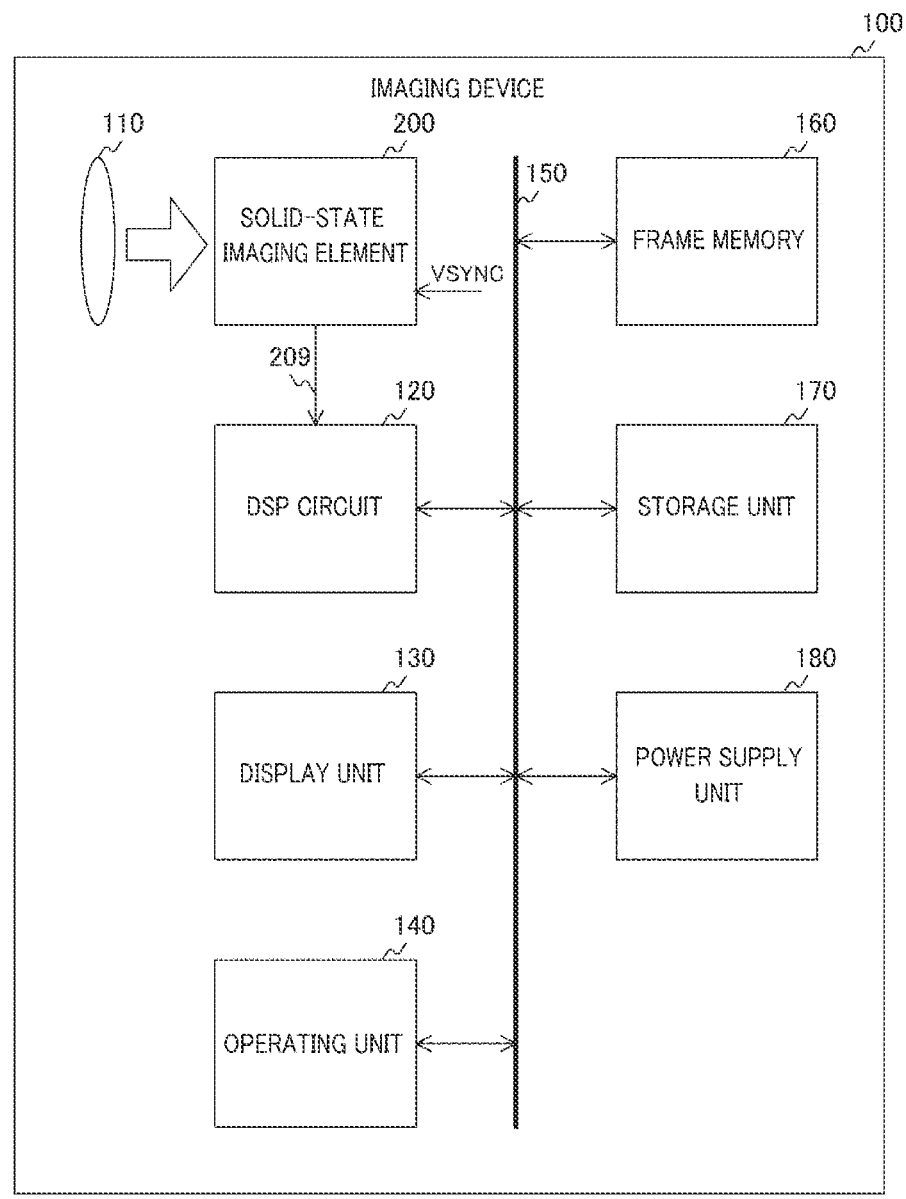
FIG. 1 is a block diagram illustrating a configuration example of an imaging device according to a first embodiment of the present technology.

FIG. 1 is a block diagram illustrating a configuration example of an imaging device 100 according to a first embodiment of the present technology. The imaging device 100 is a device for capturing image data, and includes an optical unit 110, a solid-state imaging element 200, and a DSP (Digital Signal Processing) circuit 120. The imaging device 100 further includes a display unit 130, an operating unit 140, a bus 150, a frame memory 160, a storage unit 170, and a power supply unit 180. As the imaging device 100, for example, in addition to a digital camera such as a digital still camera, a smartphone, a wearable device, a personal computer, an in-vehicle camera, or the like may be used.

The optical unit 110 collects the light from a subject and guides the light to the solid-state imaging element 200. The solid-state imaging element 200 generates image data by photoelectric conversion in synchronization with a vertical synchronization signal VSYNC. The vertical synchronization signal VSYNC is a periodic signal having a predetermined frequency indicating the imaging timing. The solid-state imaging element 200 supplies the generated image data to the DSP circuit 120 via a signal line 209. The solid-state imaging element executes image processing such as image recognition on the image data as necessary, and supplies the processed data to the DSP circuit 120.

The DSP circuit 120 executes predetermined signal processing on the image data from the solid-state imaging element 200. The DSP circuit 120 outputs the processed image data to the frame memory 160 or the like via the bus 150.

The display unit 130 displays image data. As the display unit 130, for example, a liquid crystal panel or an organic EL (Electro Luminescence) panel may be used. The operating unit 140 generates an operation signal according to the operation of the user.

The bus 150 is a common route for the optical unit 110, the solid-state imaging element 200, the DSP circuit 120, the display unit 130, the operating unit 140, the frame memory 160, the storage unit 170, and the power supply unit 180 to exchange data with each other.

The frame memory 160 holds image data. The storage unit 170 stores various kinds of data such as image data. The power supply unit 180 supplies power to the solid-state imaging element 200, the DSP circuit 120, the display unit 130, and the like.

[Configuration Example of Solid-State Imaging Element]

Figure 2:
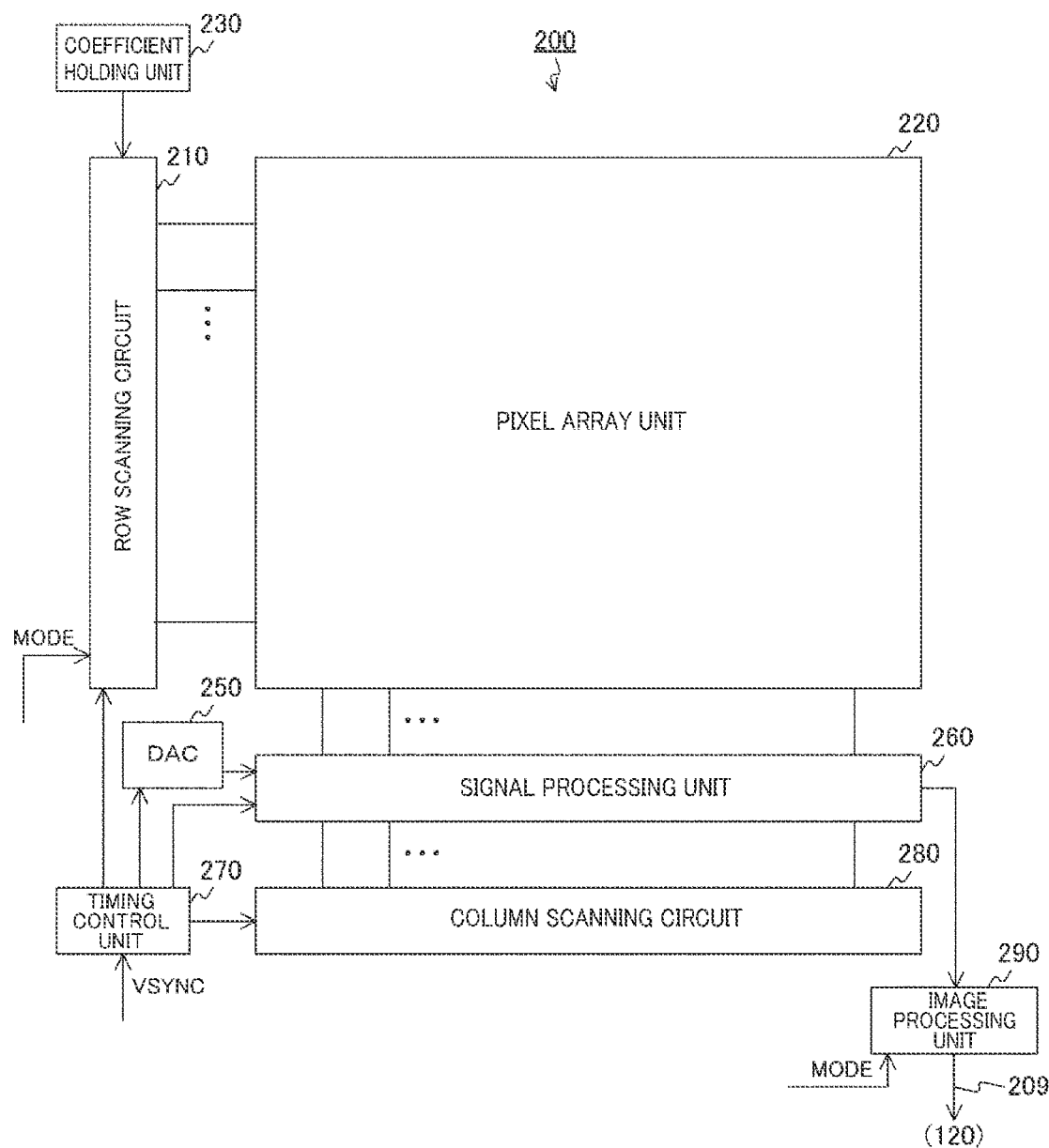
FIG. 2 is a block diagram illustrating a configuration example of a solid-state imaging element according to the first embodiment of the present technology.

FIG. 2 is a block diagram illustrating a configuration example of the solid-state imaging element 200 according to the first embodiment of the present technology. The solid-state imaging element 200 includes a row scanning circuit 210, a pixel array unit 220, a coefficient holding unit 230, a DAC (Digital to Analog Converter) 250, a signal processing unit 260, a timing control unit 270, a column scanning circuit 280, and an image processing unit 290.

A plurality of pixels are arranged in a two-dimensional lattice pattern in the pixel array unit 220. The coefficient holding unit 230 holds a weighting coefficient that constitutes a kernel of a predetermined size. The size of the kernel is, for example, 3 rows×3 columns.

The row scanning circuit 210 sequentially drives the rows in the pixel array unit 220 according to a mode signal MODE to generate a pixel signal. Here, the mode signal MODE is a signal indicating one of a plurality of modes including an image recognition mode in which image recognition is executed and a normal mode in which image recognition is not performed. The mode signal MODE is generated by, for example, the DSP circuit 120.

In the image recognition mode, the row scanning circuit 210 reads the weighting coefficient from the coefficient holding unit 230. Then, the row scanning circuit 210 simultaneously generates an amount of charge corresponding to the weighting coefficient for all the pixels in the pixel array unit 220, and externally transfers the charge to the adjacent pixels. Here, "external transfer" means transferring charge between pixels. The row scanning circuit 210 simultaneously generates an amount of charge corresponding to the weighting coefficient for all the pixels and accumulates the charge together with the externally transferred charge. Next, the row scanning circuit 210 drives the rows in order to output a pixel signal corresponding to the amount of accumulated charge to the signal processing unit 260.

On the other hand, in the normal mode, the row scanning circuit 210 generates and accumulates charge for all the pixels over the exposure period without using the weighting coefficient. Then, the row scanning circuit 210 drives the rows in order to output a pixel signal corresponding to the amount of accumulated charge to the signal processing unit 260.

The row scanning circuit 210 is an example of a scanning circuit described in the claims.

The timing control unit 270 controls the operation timings of the row scanning circuit 210, the DAC 250, the signal processing unit 260, and the column scanning circuit 280 in synchronization with the vertical synchronization signal VSYNC.

The DAC 250 generates a predetermined reference signal that changes in a slope with the passage of time by DA (Digital to Analog) conversion. The DAC 250 supplies the generated reference signal to the pixel array unit 220.

The signal processing unit 260 performs predetermined signal processing including AD (Analog to Digital) conversion on the pixel signal from the pixel array unit 220 for each column. The signal processing unit 260 supplies the processed pixel data to the image processing unit 290.

The column scanning circuit 280 drives the signal processing unit 260 under the control of the timing control unit 270 to sequentially output pixel data.

The image processing unit 290 executes predetermined image processing on the image data composed of the pixel data. In the image recognition mode, the image processing unit 290 executes a predetermined convolution operation on the image data, and executes image recognition processing using the calculated data. On the other hand, in the normal mode, the image processing unit 290 executes various kinds of image processing such as demosaic processing and white balance processing. Then, the image processing unit 290 supplies the processed data to the DSP circuit 120.

The DSP circuit 120 may execute at least a part of the processing of the image processing unit 290.

FIG. 3 is a diagram illustrating an example of a kernel according to the first embodiment of the present technology. The number of rows in the pixel array unit 220 is I (I is an integer), and the number of columns is J (J is an integer). When focusing on a pixel in a certain i-th (i is an integer of 0 to I−1) row and j-th (j is an integer of 0 to J−1) column in the pixel array unit 220, a predetermined weighting coefficient to be applied is set to each of the pixel of interest and a predetermined number of adjacent pixels adjacent to the pixel of interest. For example, a weighting coefficient is set to each of nine pixels at the addresses of (i−1, j−1), (i−1, j), (i−1, j+1), (i, j−1), (i, j), (i, j+1), (i+1, j−1), (i+1, j) and (i+1, j+1). These weighting coefficients are $w_0$ to $w_8$. The coefficient holding unit 230 holds the weighting coefficients $w_0$ to $w_8$.

The set of weighting coefficients illustrated in the drawing is generally called a kernel (or filter). The number of weighting coefficients in the kernel, in other words, the number of pixels to which the kernel is applied, corresponds to the size of the kernel.

[Configuration Example of Pixel Array Unit]

Figure 4:
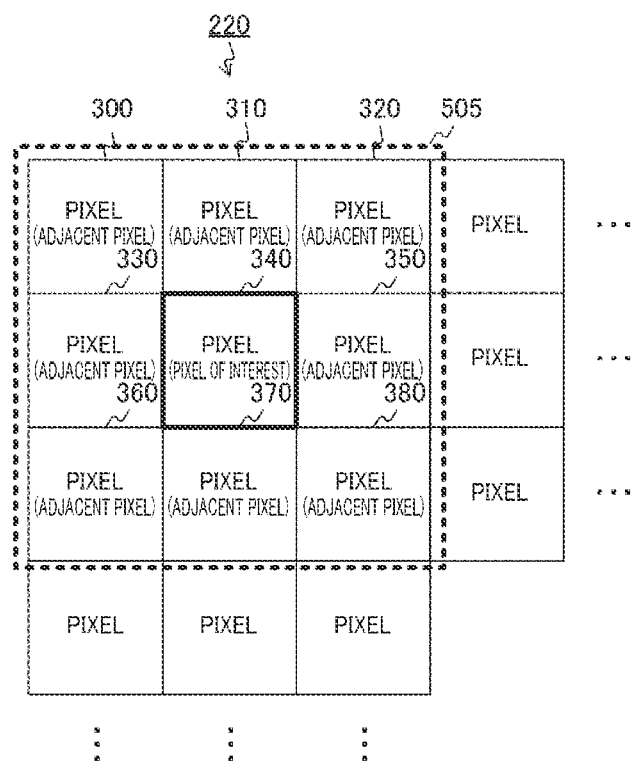
FIG. 4 is a diagram illustrating a configuration example of a pixel array unit according to the first embodiment of the present technology.

FIG. 4 is a diagram illustrating a configuration example of the pixel array unit 220 according to the first embodiment of the present technology. In the pixel array unit 220, a plurality of pixels such as pixels 300, 310, 320, 330, 340, 350, 360, 370, and 380 are arranged in a two-dimensional lattice pattern.

The kernel is applied to nine pixels including a pixel of interest and eight adjacent pixels therearound using each of all the pixels in the pixel array unit 220 as the pixel of interest. For example, focusing on the pixel 340, the pixels 300, 310, 320, 330, 350, 360, 370 and 380 are adjacent to the pixel 340. Here, "adjacent" means that the Euclidean distance from the pixel of interest is within a certain value. The kernel is applied to a pixel block 505 of nine pixels of 3 rows×3 columns including the pixel of interest and eight adjacent pixels therearound.

Further, when focusing on the pixel 350, the kernel is applied to the pixel 350 and eight pixels (the pixel 340 or the like) adjacent to the pixel 350. The same applies to other pixels.

The adjacent pixel (the pixel 300 or the like) generates an amount of charge corresponding to the weighting coefficient corresponding to the adjacent pixel under the control of the row scanning circuit 210 and transfers the charge to the pixel of interest externally. The pixel of interest (the pixel 340 or the like) generates an amount of charge corresponding to the weighting coefficient corresponding to the pixel of interest under the control of the row scanning circuit 210, and accumulates the charge together with the externally transferred charge. For example, when the weighting coefficient $w_0$ of the adjacent pixel is 1.5 times the weighting coefficient $w_4$ of the pixel of interest, the row scanning circuit 210 sets the exposure time of the pixel 300 to 1.5 times the pixel 340, and the pixels are exposed in order. By setting the exposure time to a time proportional to the weighting coefficient in this way, an amount of charge corresponding to the weighting coefficient is generated. By integrating these charges, a convolutional operation of the 0-th layer in CNN is performed. The convolution operation after the first and subsequently layers is executed by the image processing unit 290.

[Configuration Example of Pixel Circuit]

Figure 5:
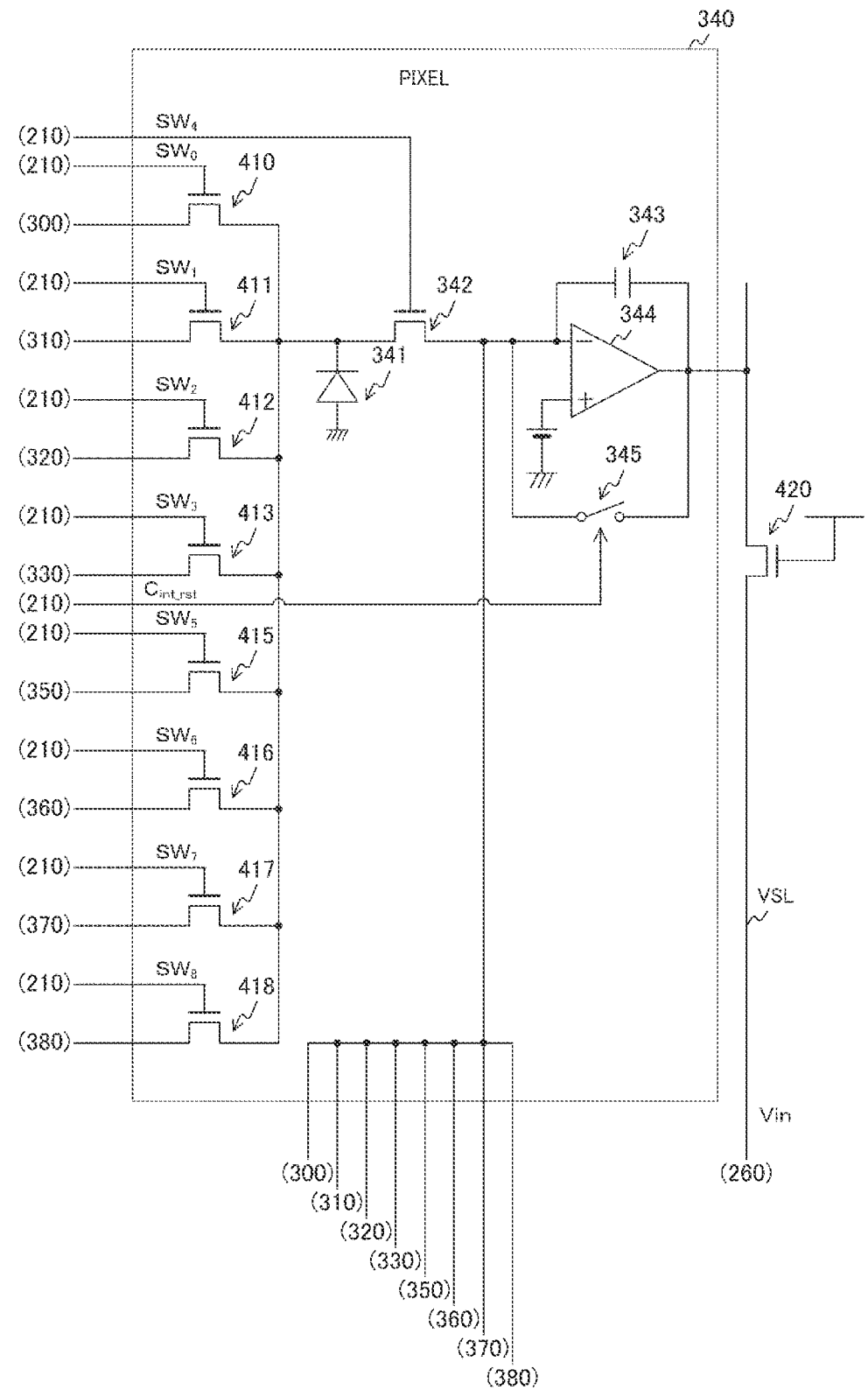
FIG. 5 is a circuit diagram illustrating a configuration example of a pixel according to the first embodiment of the present technology.

FIG. 5 is a circuit diagram illustrating a configuration example of the pixel 340 according to the first embodiment of the present technology. The pixel 340 includes a photoelectric conversion element 341, a transfer transistor 342, a capacitor 343, an operational amplifier 344 and a reset switch 345, and transfer transistors 410, 411, 412, 413, 415, 416, 417 and 418.

The photoelectric conversion element 341 generates charge by photoelectric conversion. As the photoelectric conversion element 341, for example, a photodiode is used.

The transfer transistor 342 internally transfers the charge from the photoelectric conversion element 341 to the capacitor 343 according to the transfer signal $SW_4$ from the row scanning circuit 210. Here, "internal transfer" means transferring charge between elements in a pixel.

The transfer transistor 410 externally transfers the charge from the photoelectric conversion element 341 to the adjacent pixel 300 according to a transfer signal $SW_0$ from the row scanning circuit 210. The transfer transistor 411 externally transfers the charge from the photoelectric conversion element 341 to the adjacent pixel 310 according to a transfer signal $SW_1$ from the row scanning circuit 210. The transfer transistor 412 externally transfers the charge from the photoelectric conversion element 341 to the adjacent pixel 320 according to a transfer signal $SW_2$ from the row scanning circuit 210. The transfer transistor 413 externally transfers the charge from the photoelectric conversion element 341 to the adjacent pixel 330 according to a transfer signal $SW_3$ from the row scanning circuit 210.

The transfer transistor 415 externally transfers the charge from the photoelectric conversion element 341 to the adjacent pixel 350 according to a transfer signal $SW_5$ from the row scanning circuit 210. The transfer transistor 416 externally transfers the charge from the photoelectric conversion element 341 to the adjacent pixel 360 according to a transfer signal $SW_6$ from the row scanning circuit 210. The transfer transistor 417 externally transfers the charge from the photoelectric conversion element 341 to the adjacent pixel 370 according to a transfer signal $SW_7$ from the row scanning circuit 210. The transfer transistor 418 externally transfers the charge from the photoelectric conversion element 341 to the adjacent pixel 380 according to a transfer signal $SW_8$ from the row scanning circuit 210.

The capacitor 343 accumulates and holds the charge internally transferred by the transfer transistor 342 and the charge externally transferred by the adjacent pixels 300, 310, 320, 330, 350, 360, 370 and 380. The capacitor 343 is inserted between the inverting input terminal (−) and the output terminal of the operational amplifier 344. The capacitor 343 generates a voltage corresponding to the amount of accumulated charge.

The operational amplifier 344 outputs a voltage corresponding to the amount of charge accumulated in the inverting input terminal (−) to the output terminal as a pixel signal. The inverting input terminal (−) of the operational amplifier 344 is connected to the transfer transistor 342, the capacitor 343 and the reset switch 345, and the pixels 300, 310, 320, 330, 350, 360, 370 and 380. The non-inverting input terminal (+) of the operational amplifier 344 is connected to a predetermined power source. The output terminal of the operational amplifier 344 is connected to a vertical signal line VSL.

The reset switch 345 short-circuits the inverting input terminal (−) and the output terminal of the operational amplifier 344 according to a reset signal $C_{int\_rst}$ from the row scanning circuit 210. This short-circuiting initializes the amount of charge of the capacitor 343.

The vertical signal line VSL is wired along the vertical direction for each row. A load MOS (Metal-Oxide-Semiconductor) transistor 420 is inserted in the vertical signal line VSL. Then, an analog pixel signal Vin is output to the signal processing unit 260 via the vertical signal line VSL.

The configuration of pixels (the pixel 300 and the like) other than the pixel 340 is the same as that of the pixel 340. However, the number of adjacent pixels at the outermost circumference of the pixel array unit 220 is less than 8. Here, the "outermost circumference" means that the row address is either I or 0 or the column address is either J or 0. For example, the pixel at the address (0,0) does not have adjacent pixels at the upper left, upper, upper right, left, and lower left side thereof. In such pixels, a reset power source is connected to a transfer transistor having no transfer destination adjacent pixel. In this way, zero-padding is realized. It is also possible to reduce the number of transfer transistors having no transfer destination.

The transfer transistor 342 is an example of an internal transfer transistor described in the claims. Transfer transistors 410, 411, 412, 413, 415, 416, 417 and 418 are examples of an external transfer transistor described in the claims. The capacitor 343 is an example of a charge accumulation unit described in the claims.

The size of the kernel is set to 3 rows×3 columns, and nine transfer transistors (the transfer transistors 410 and the like) are arranged according to the size, but the size of the kernel is not limited to 3 rows×3 columns. For example, the size of the kernel may be 5 rows×5 columns. In this case, twenty-five transfer transistors may be arranged for each pixel, and the number of exposures may be 25.

Figure 6:
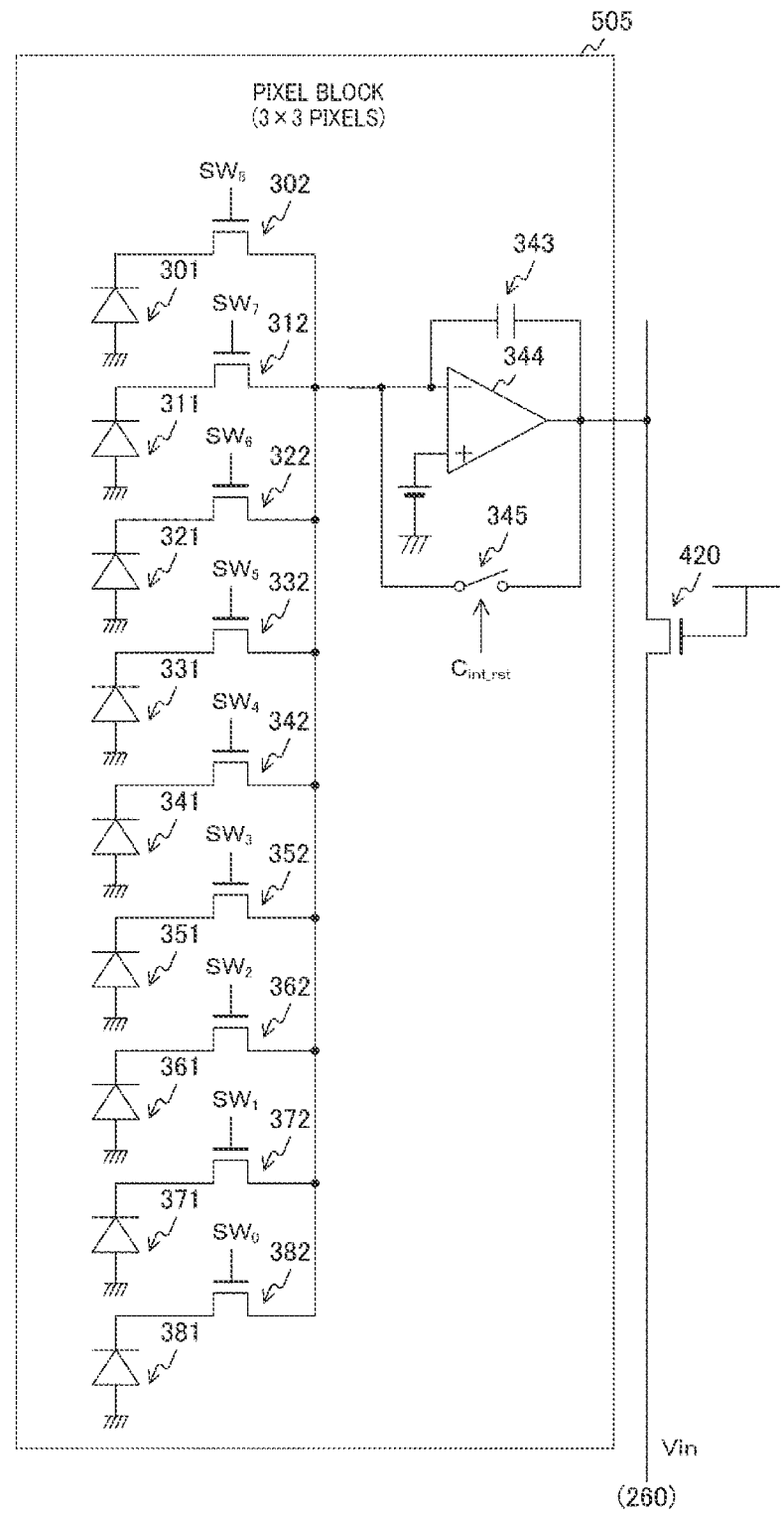
FIG. 6 is a circuit diagram illustrating a configuration example of a pixel block according to the first embodiment of the present technology.

FIG. 6 is a circuit diagram illustrating a configuration example of the pixel block 505 according to the first embodiment of the present technology. In this pixel block 505, pixels 300, 310, 320, 330, 340, 350, 360, 370 and 380 of 3 rows×3 columns are arranged.

In the pixel block 505, photoelectric conversion elements 301, 311, 321, 331, 341, 351, 361, 371 and 381 are arranged. Further, the transfer transistors 302, 312, 322, 332, 342, 352, 362, 372 and 382, the capacitor 343, the operational amplifier 344 and the reset switch 345 are arranged.

The photoelectric conversion element 301 and the transfer transistor 302 are arranged in the pixel 300, and the photoelectric conversion element 311 and the transfer transistor 312 are arranged in the pixel 310. The photoelectric conversion element 321 and the transfer transistor 322 are arranged in the pixel 320, and the photoelectric conversion element 331 and the transfer transistor 332 are arranged in the pixel 330. The photoelectric conversion element 351 and the transfer transistor 352 are arranged in the pixel 350, and the photoelectric conversion element 361 and the transfer transistor 362 are arranged in the pixel 360. The photoelectric conversion element 371 and the transfer transistor 372 are arranged in the pixel 370, and the photoelectric conversion element 381 and the transfer transistor 382 are arranged in the pixel 380.

In the drawing, the capacitors, operational amplifiers, and reset switches in the pixels other than the pixel 340 are omitted. The transfer transistors 410, 411, 412, 413, 415, 416, 417 and 418 in the pixel 340 are omitted.

In the image recognition mode, the pixel of interest is the pixel 340, and the transfer transistor 302 and the like of the pixels adjacent to the pixel of interest externally transfer an amount of charge corresponding to the corresponding weighting coefficient from the corresponding photoelectric conversion element 301 and the like to the capacitor 343 of the pixel of interest.

The transfer transistor 342 in the pixel of interest (the pixel 340) internally transfers an amount of charge corresponding to the corresponding weighting coefficient from the corresponding photoelectric conversion element 341 to the capacitor 343. The capacitor 343 accumulates these charges. In this way, the charges generated by the nine pixels in the pixel block 505 are added. Since each of the transferred charge amounts is the amount corresponding to the weighting coefficient, the amount of accumulated charge of the capacitor 343 is the amount corresponding to the result of a product-sum operation convoluted using the kernel of 3 rows×3 columns.

On the other hand, in the normal mode, the transfer transistor (the transfer transistor 342 or the like) of each pixel performs only internal transfer of charge. In this way, the image data when the kernel is not applied is generated.

Figure 7:
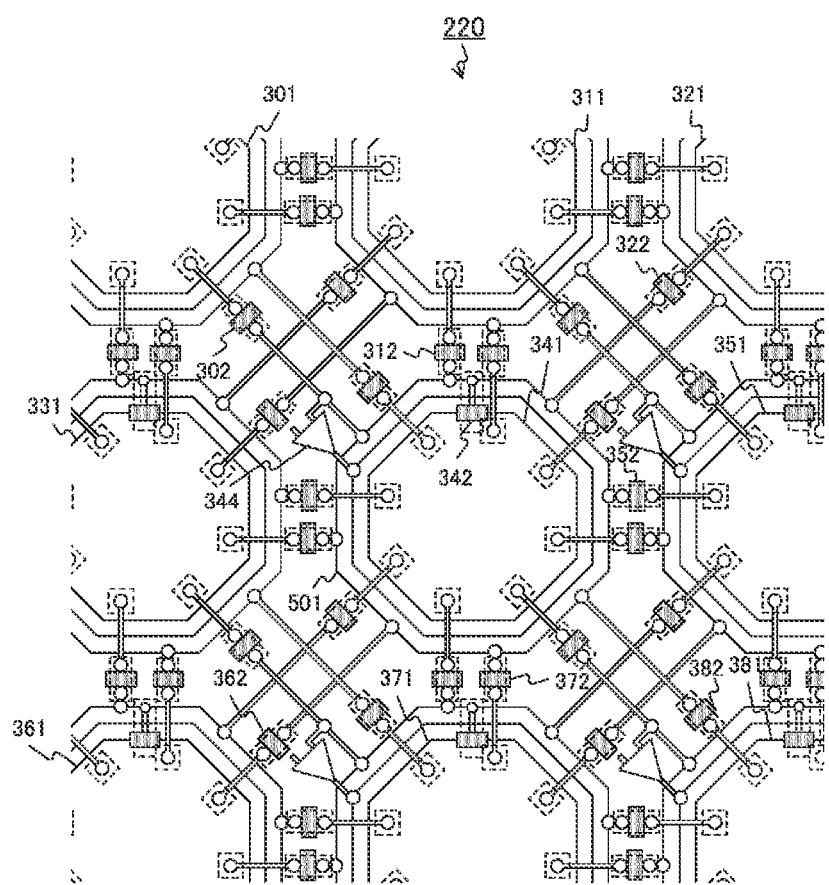
FIG. 7 is a diagram illustrating an example of a layout of elements in a pixel array unit according to the first embodiment of the present technology.

FIG. 7 is a diagram illustrating an example of the layout of the elements in the pixel array unit 220 according to the first embodiment of the present technology. The transfer transistors 302, 312, 322, 332, 352, 362, 372 and 382 are arranged between the signal line 501 and the eight photoelectric conversion elements 301, 311, 321, 331, 351, 361, 371 and 381 around the photoelectric conversion element 341. Further, the transfer transistor 342 is arranged between the photoelectric conversion element 341 and the signal line 501.

The signal line 501 is wired so as to surround the photoelectric conversion element 341 and is connected to the input terminal of the operational amplifier 344. The capacitor 343 and the reset switch 345 are omitted in the drawing.

[Configuration Example of Signal Processing Unit]

Figure 8:
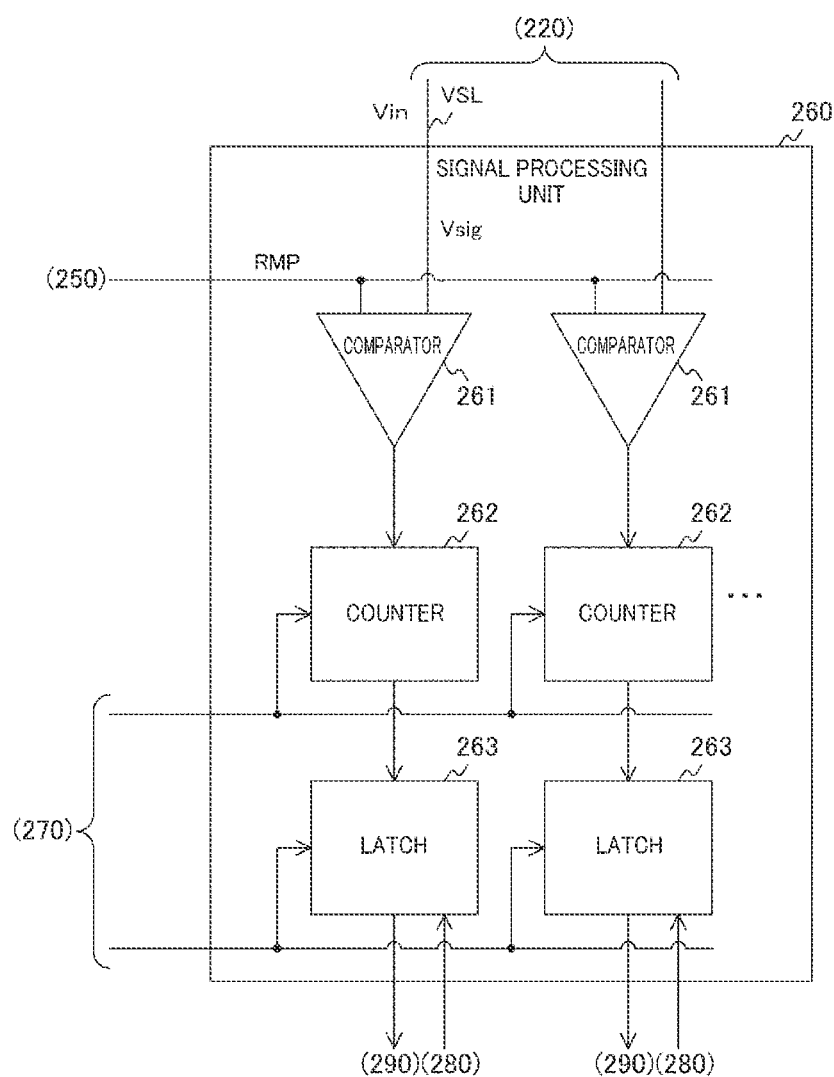
FIG. 8 is a block diagram illustrating a configuration example of a signal processing unit according to the first embodiment of the present technology.

FIG. 8 is a block diagram illustrating a configuration example of the signal processing unit 260 according to the first embodiment of the present technology. A plurality of comparators 261 and a plurality of counters 262 and a plurality of latches 263 are arranged in the signal processing unit 260.

The comparator 261 and the counter 262 and the latch 263 are provided for each row. Assuming that the number of columns is J, J comparators 261 and J counters 262 and J latches 263 are provided.

The comparator 261 compares a reference signal RMP from the DAC 250 with a pixel signal Vin from the corresponding column. The comparator 261 supplies the comparison result to the counter 262.

The counter 262 counts the count value over a period until the comparison result COMP is reversed. The counter 262 outputs a digital signal indicating the count value to the latch 263 so that the digital signal is held therein. Further, a counter control signal for controlling the counting operation is input to the counter 262.

The latch 263 holds the digital signal of the corresponding row. The latch 263 outputs a digital signal to the image processing unit 290 as pixel data under the control of the column scanning circuit 280.

The above-mentioned comparator 261 and counter 262 convert an analog pixel signal into digital pixel data. That is, the comparator 261 and the counter 262 function as an ADC. An ADC having a simple structure including a comparator and a counter in this way is called a single-slope ADC.

Further, in addition to the AD conversion, the signal processing unit 260 performs CDS (Correlated Double Sampling) processing for obtaining the difference between a reset level and a signal level for each column. Here, the reset level is the level of the pixel signal at the time of pixel initialization, and the signal level is the level of the pixel signal at the end of exposure. For example, the CDS processing is realized by the counter 262 performing one of the down-counting and the up-counting at the time of converting the reset level, and the counter 262 performing the other of the down-counting and the up-counting at the time of converting the signal level. It should be noted that the counter 262 may be configured to perform only up-counting, and a circuit for performing CDS processing may be added in the subsequent stage.

[Operation Example of Solid-State Imaging Element]

Figure 9:
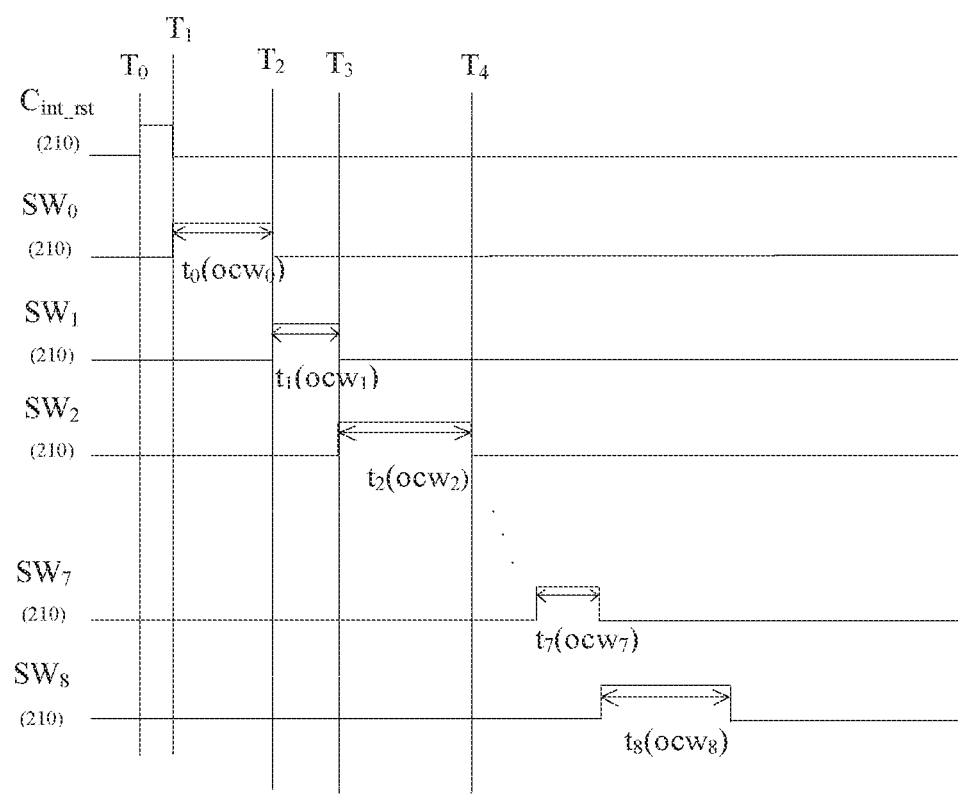
FIG. 9 is a timing chart illustrating an example of the operation of the solid-state imaging element according to the first embodiment of the present technology.

FIG. 9 is a timing chart illustrating an example of the operation of the solid-state imaging element 200 according to the first embodiment of the present technology. When the image recognition mode is set, the row scanning circuit 210 supplies a high-level reset signal $C_{int\_rst}$ to all pixels at timings T0 to T1 to initialize the amount of charge of the capacitors (the capacitor 343 and the like) of all pixels.

Next, over the period of timings T1 to T2, the row scanning circuit 210 supplies the high-level transfer signal $SW_0$ to all pixels. In this way, exposure is performed on all the pixels over the period of timings T1 and T2, and each pixel transfers the charge to, for example, the pixel on the lower-right corner thereof. The exposure time $t_0$ is a time corresponding to the weighting coefficient $w_0$.

Then, over the period of timings T2 to T3, the row scanning circuit 210 supplies the high-level transfer signal $SW_1$ to all the pixels. In this way, exposure is performed on all the pixels over the period of timings T2 to T3, and each pixel transfers a charge to, for example, a pixel on the lower side thereof. The exposure time $t_1$ is a time corresponding to the weighting coefficient $w_1$.

Subsequently, over the period of timings T3 to T4, the row scanning circuit 210 supplies the high-level transfer signal $SW_2$ to all the pixels. In this way, exposure is performed on all the pixels over the period of timings T3 to T4, and each pixel transfers the charge to, for example, the pixel on the lower-left corner thereof. The exposure time $t_2$ is a time corresponding to the weighting coefficient $w_2$. Hereinafter, similarly, the transfer signals $SW_4$ to $SW_8$ are supplied in order.

Figure 10:
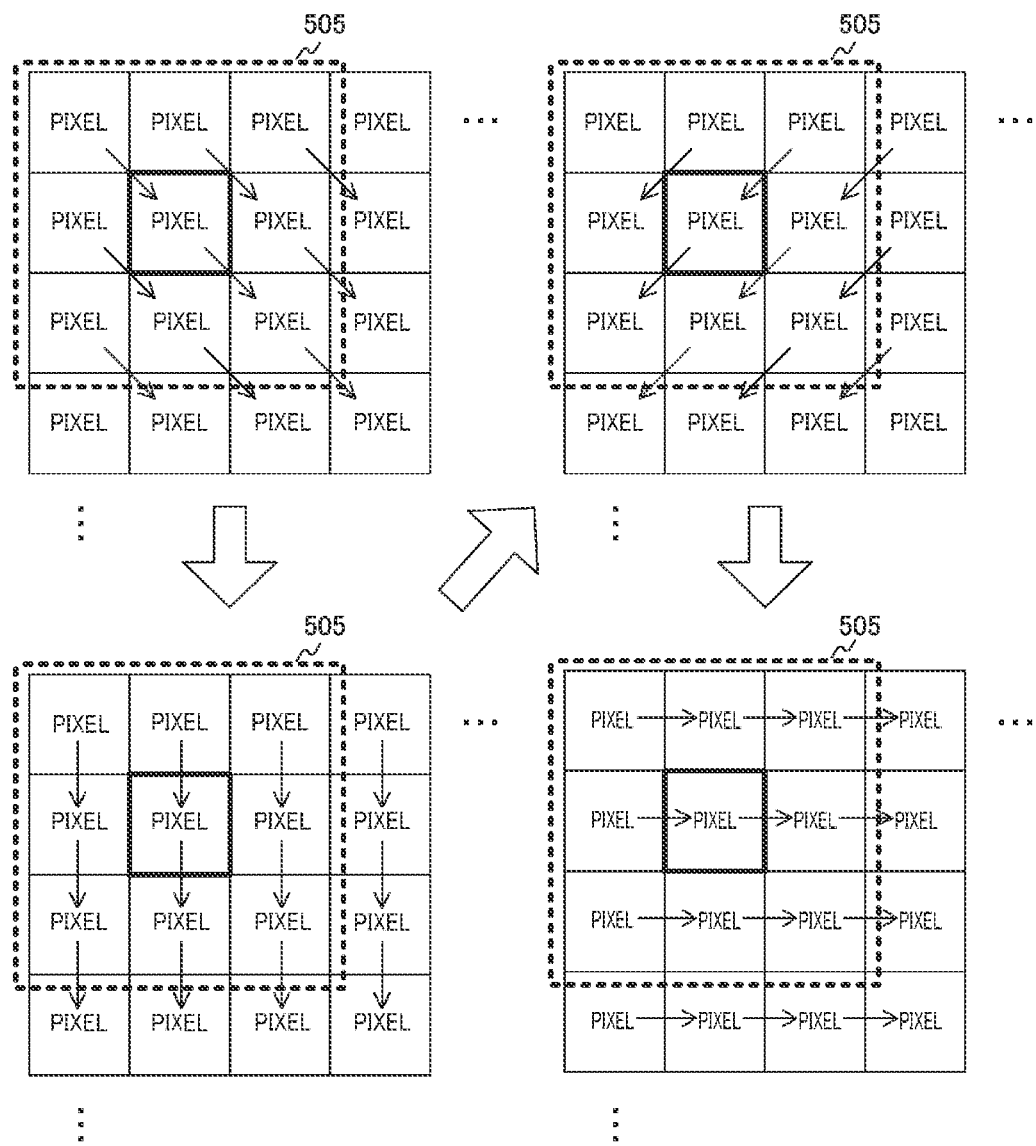
FIG. 10 is a diagram for explaining the 0-th to third transfer control in the first embodiment of the present technology.

FIG. 10 is a diagram for explaining the 0-th to third transfer control in the first embodiment of the present technology. First, the row scanning circuit 210 causes all the pixels to generate an amount of charge corresponding to the weighting coefficient $w_0$ according to the transfer signal $SW_0$, and transfer (that is, external transfer) the charge to the pixels on the lower-right corner thereof. In the drawing, the arrows indicate the direction of charge transfer.

Next, the row scanning circuit 210 causes all the pixels to generate an amount of charge corresponding to the weighting coefficient $w_1$ according to the transfer signal $SW_1$ and transfer the charge to the pixels on the lower side thereof. Subsequently, the row scanning circuit 210 causes all the pixels to generate an amount of charge corresponding to the weighting coefficient $w_2$ according to the transfer signal $SW_2$ and transfer the charge to the pixels on the lower-left corner thereof. Then, the row scanning circuit 210 causes all the pixels to generate an amount of charge corresponding to the weighting coefficient $w_3$ according to the transfer signal $SW_3$ and transfer the charge to the pixels on the right side thereof.

Figure 11:
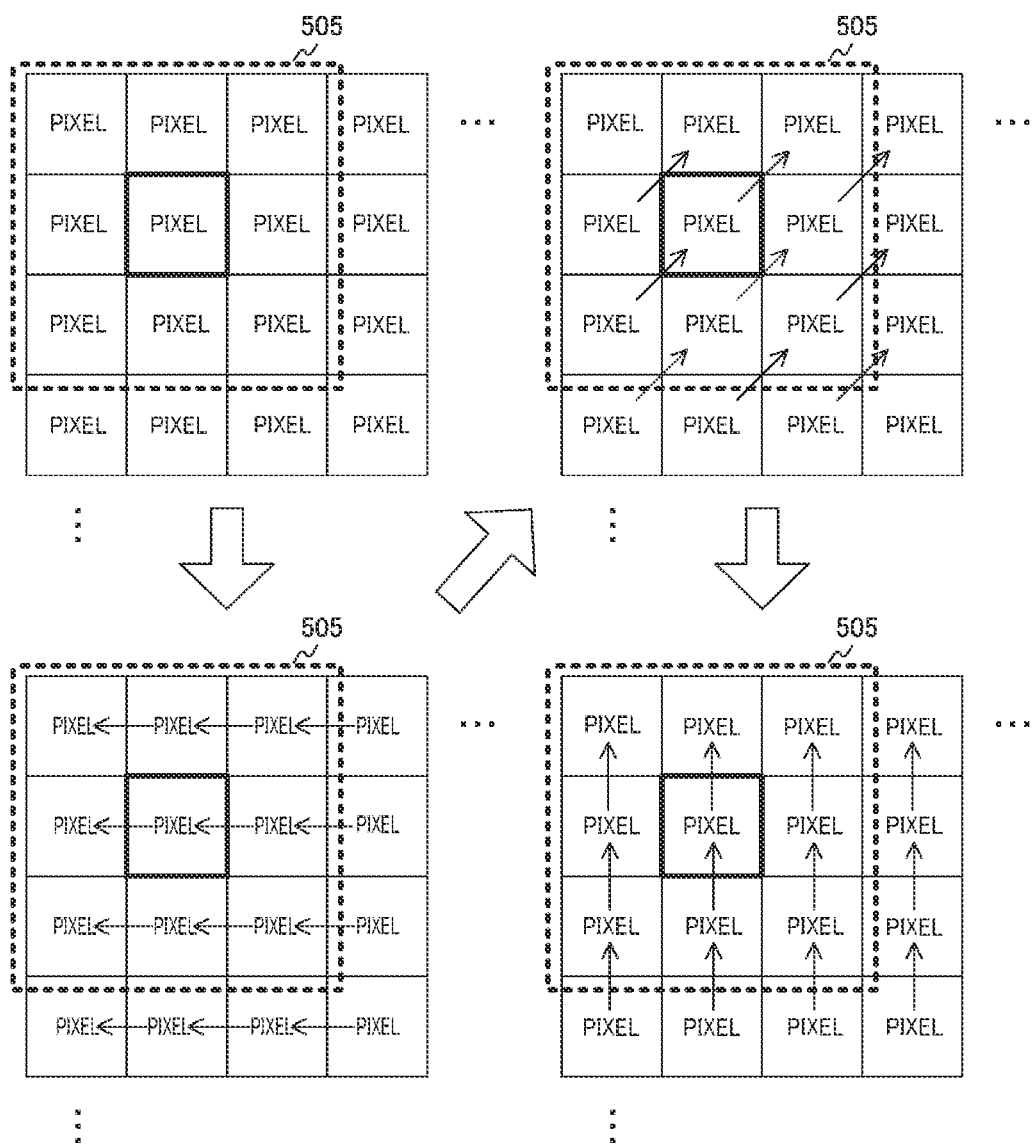
FIG. 11 is a diagram for explaining the fourth to seventh transfer control in the first embodiment of the present technology.

FIG. 11 is a diagram for explaining the fourth to seventh transfer control in the first embodiment of the present technology. The row scanning circuit 210 causes all the pixels to generate an amount of charge corresponding to the weighting coefficient $w_4$ according to the transfer signal $SW_4$ and internally transfer the charge to the capacitors.

Next, the row scanning circuit 210 causes all the pixels to generate a charge in an amount corresponding to the weighting coefficient $w_5$ according to the transfer signal $SW_5$ and transfer the charge to the pixel on the left side thereof. Subsequently, the row scanning circuit 210 causes all the pixels to generate an amount of charge corresponding to the weighting coefficient $w_6$ according to the transfer signal $SW_6$ and transfer the charge to the pixels on the upper-right corner thereof. Then, the row scanning circuit 210 causes all the pixels to generate an amount of charge corresponding to the weighting coefficient $w_7$ according to the transfer signal $SW_7$ and transfer the charge to the pixels on the upper side thereof.

Figure 12:
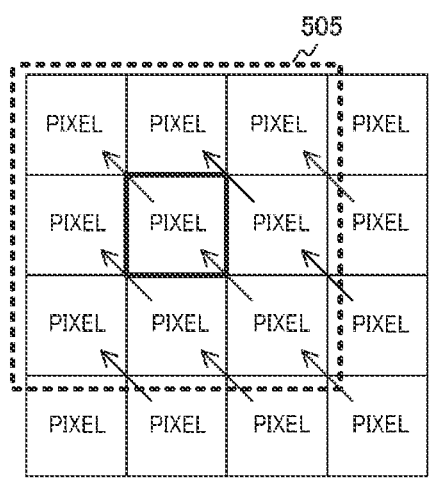
FIG. 12 is a diagram for explaining the eighth transfer control in the first embodiment of the present technology.

FIG. 12 is a diagram for explaining the eighth transfer control in the first embodiment of the present technology. The row scanning circuit 210 causes all the pixels to generate an amount of charge corresponding to the weighting coefficient $w_8$ according to the transfer signal $SW_8$ and transfer the charge to the pixels on the upper-left corner thereof.

By the nine exposures and transfers illustrated in FIGS. 10 to 12, the results of convolution operation of the respective charge amounts of the pixel and the eight pixels therearound by the weighting coefficient of the kernel are held in the capacitors of all the pixels. The pixel signal Vin corresponding to the amount of charge is expressed by, for example, the following equation.

$$Vin = V_0 \times w_0 + V_1 \times w_1 + V_2 \times w_2 + V_3 \times w_3 + V_4 \times w_4 + V_5 \times w_5 + V_6 \times w_6 + V_7 \times w_7 + V_8 \times w_8$$

In the above equation, $V_1$ to $V_8$ are pixel signals of the pixels 300 to 380, respectively, when the kernel is not applied.

The row scanning circuit 210 supplies the transfer signals in the order of $SW_0$ to $SW_8$, but the order of these nine transfers is not limited to the order illustrated in FIGS. 9 to 12.

Here, as a comparative example, a solid-state imaging element is assumed in which image data in which digital pixel data is arranged is subjected to a convolution operation in order for each pixel using the kernel.

Figure 13:
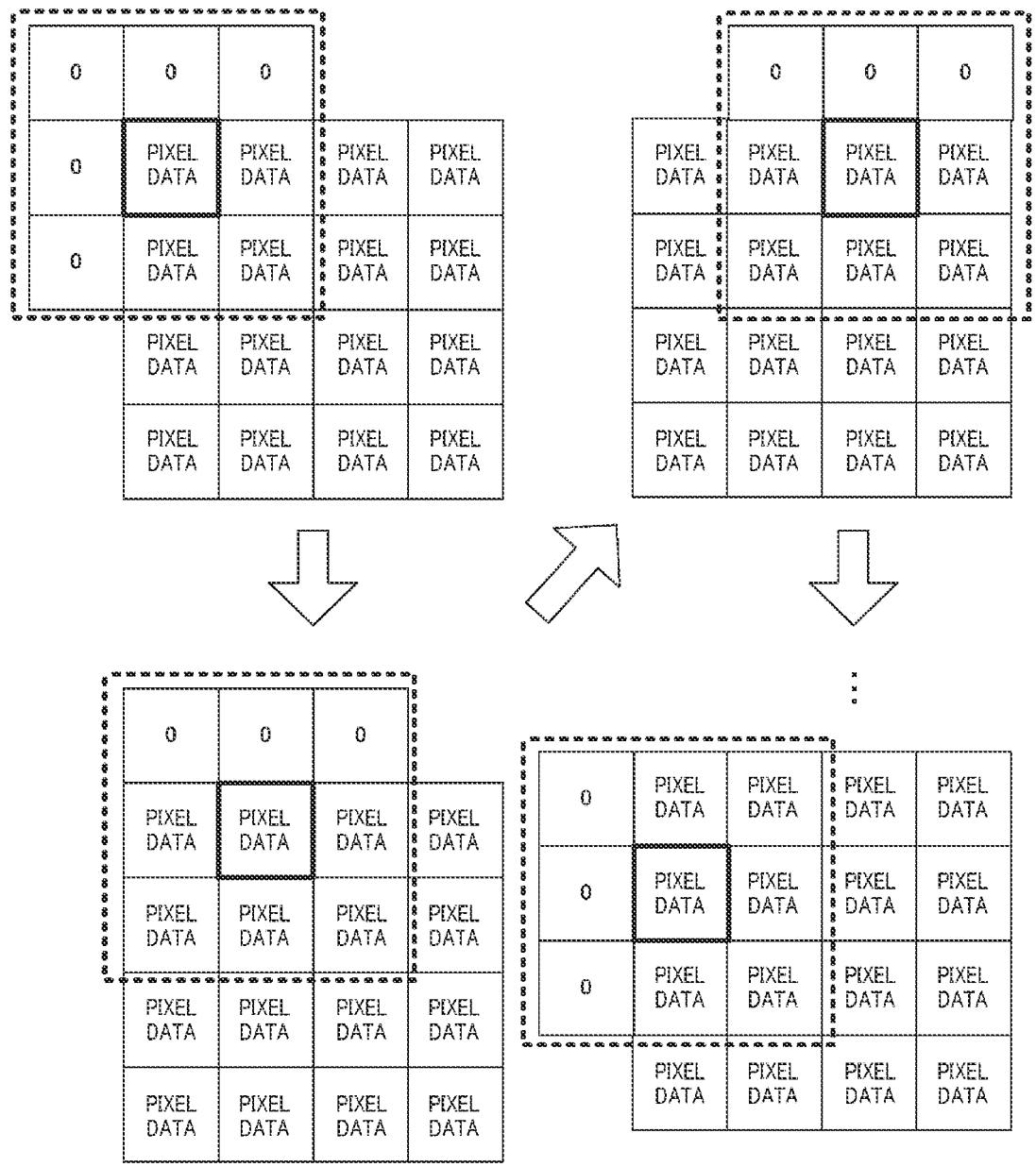
FIG. 13 is a diagram for explaining an example of the operation of the 0-th layer in a comparative example.

FIG. 13 is a diagram for explaining an example of the operation of the 0-th layer in the comparative example. The solid-state imaging element of this comparative example first focuses on the upper-leftmost pixel, that is, the pixel at the address (0, 0), and performs a convolution operation on the pixel of interest and the eight pixels therearound using the kernel. However, since the upper-left pixel does not have the upper left, upper, upper right, left, or lower-left pixel data, the pixel data having a value of "0" is inserted instead of them. In other words, zero-padding is done.

Next, the solid-state imaging element focuses on the pixel at the address (0, 1), and performs a convolution operation on the pixel of interest and the eight pixels therearound using the kernel. Then, the solid-state imaging element focuses on the pixel at the address (0, 2), and performs a convolution operation on the pixel of interest and the eight pixels therearound using the kernel. Hereinafter, similarly, the convolution operation is executed for each pixel in the 0-th row. Then, the solid-state imaging element focuses on the pixel at the address (1, 0), and performs a convolution operation on the pixel of interest and the eight pixels therearound using the kernel. Hereinafter, similarly, the convolution operation is executed for each pixel in the first row. The same applies to the second and subsequent rows of the 0-th layer and the first and subsequent layers. A CNN is realized by the processing of these layers.

As illustrated in the drawing, in the comparative example, the convolution operation is executed in order for each piece of the digital pixel data. In this configuration, the number of operations increases in proportion to the amount of input data (that is, the number of pixels), so that the increase in the number of pixels results in an increase in power consumption and latency.

On the other hand, in the solid-state imaging element 200 that transfers an amount of charge corresponding to the weighting coefficient, the analog circuit illustrated in FIG. 6 executes the convolution operation of the 0-th layer. Therefore, the amount of computation of the convolution operations for the digital pixel data after the first layer is reduced. By reducing the amount of computation, the power consumption of the digital circuit (image processing unit 290 or the like) that performs computation can be reduced, and the computation time can be shortened.

The convolution operation of the 0-th layer is completed by nine exposures and transfers regardless of the number of pixels as illustrated in FIGS. 9 to 12. Therefore, as compared with the comparative example, the time required for the convolution operation of the entire CNN including the 0-th layer can be shortened. Further, since the number of exposures required for the operation of the 0-th layer does not change even if the number of pixels increases, it is possible to suppress an increase in the computation time and power consumption when the number of pixels is increased.

Figure 14:
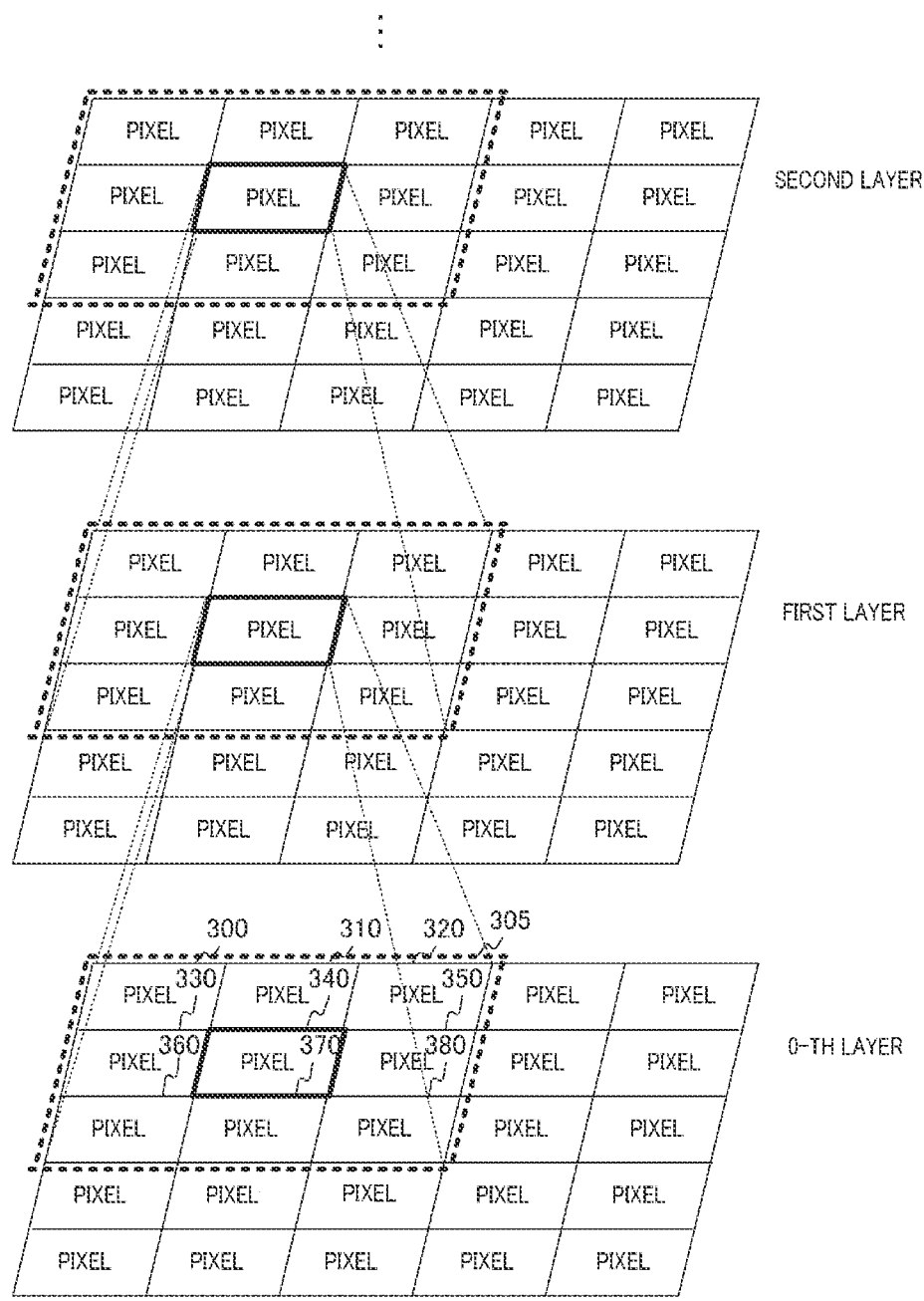
FIG. 14 is a diagram for explaining a CNN in the first embodiment of the present technology.

FIG. 14 is a diagram for explaining CNN in the first embodiment of the present technology. When the image recognition mode is set, in the 0-th layer, the pixels 310, 320, 330, 340, 350, 360, 370, and 380 generate and transfer an amount of charge corresponding to their respective weighting coefficients, and the pixel 340 adds and outputs the amounts of charge. Similar processing is executed in parallel for other pixels. In this way, the convolution operation of the 0-th layer is realized. The processing result of the 0-th layer is AD-converted by the signal processing unit 260 and digital image data is generated.

The image processing unit 290 performs a convolution operation of the first layer on the digital image data in the same manner as in the comparative example. The processing of the second and subsequent layers is executed in the same manner as in the comparative example with respect to the processing result of the layer in the previous stage.

As illustrated in the drawing, the process of executing the convolution operation using the kernel for each of the plurality of stages of layers corresponds to CNN.

Figure 15:
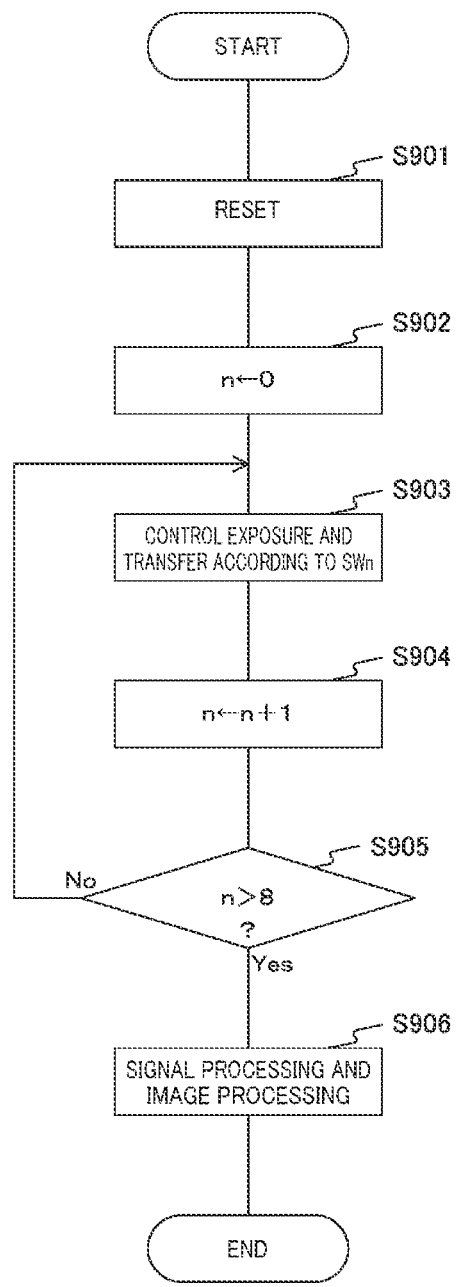
FIG. 15 is a flowchart illustrating an example of the operation of the solid-state imaging element according to the first embodiment of the present technology.

FIG. 15 is a flowchart illustrating an example of the operation of the solid-state imaging element 200 according to the first embodiment of the present technology. This operation starts, for example, when a predetermined application for image recognition is executed.

The row scanning circuit 210 in the solid-state imaging element 200 supplies the reset signal $C_{int\_rst}$ to initialize the charge amounts of all the pixels (step S901). Then, the row scanning circuit 210 sets "0" to n (n is an integer) (step S902).

The row scanning circuit 210 exposes all the pixels for an exposure time corresponding to the weighting coefficient $w_n$ according to the transfer signal $SW_n$ and transfers the charge (step S903). The row scanning circuit 210 increments n (step S904) and determines whether n is larger than "8" (step S905).

When n is "8" or less (step S905: No), the row scanning circuit 210 repeats step S903 and subsequent steps. On the other hand, when n is larger than "8" (step S905: Yes), the signal processing unit 260 and the image processing unit 290 execute signal processing and image processing (step S906), and end the operation for image recognition.

As described above, according to the first embodiment of the present technology, since the row scanning circuit 210 exposes the pixels 300 and the like over the exposure period corresponding to the weighting coefficient, each pixel can transfer and accumulate an amount of charge corresponding to the weighting coefficient. Therefore, the solid-state imaging element 200 can execute the convolution operation by a fixed number of (nine or the like) transfer operation regardless of the number of pixels. In this way, the time required for the convolution operation can be shortened as compared with the case where the convolution operation is performed sequentially for each pixel.

First Modification

In the first embodiment described above, all the pixels output the result of the convolution operation as it is, but in this configuration, the data size of the image data increases as the number of pixels increases. In CNN, in addition to the convolutional operation, a pooling process is generally executed for the purpose of providing translation invariance and reducing the data size of image data. Here, the pooling process is a process of dividing the image data into a plurality of windows and outputting the statistic (average value or maximum value) of the pixel data for each window. The solid-state imaging element 200 of the first modification of the first embodiment is different from the first embodiment in that the pooling process is further executed.

Figure 16:
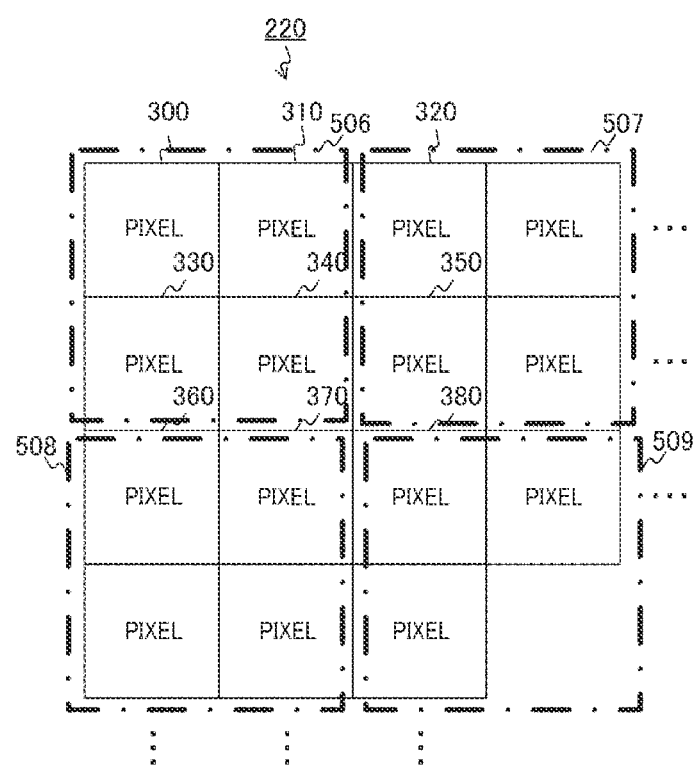
FIG. 16 is a diagram illustrating a configuration example of a pixel array unit in a first modification of the first embodiment of the present technology.

FIG. 16 is a diagram illustrating a configuration example of the pixel array unit 220 in the first modification of the first embodiment of the present technology. The pixel array unit 220 of the first modification of the first embodiment is divided by a plurality of windows such as windows 506 to 509. Here, the window is an area composed of M (M is an integer) pixels, and for example, the pixel array unit 220 is divided by a window 506 having a size of 2 rows×2 columns. Assuming that the number of pixels is I×J, the pixel array unit 220 is divided into (I×J)/4 windows. Pixels 300, 310, 330 and 340 are arranged in the window 506, for example.

Figure 17:
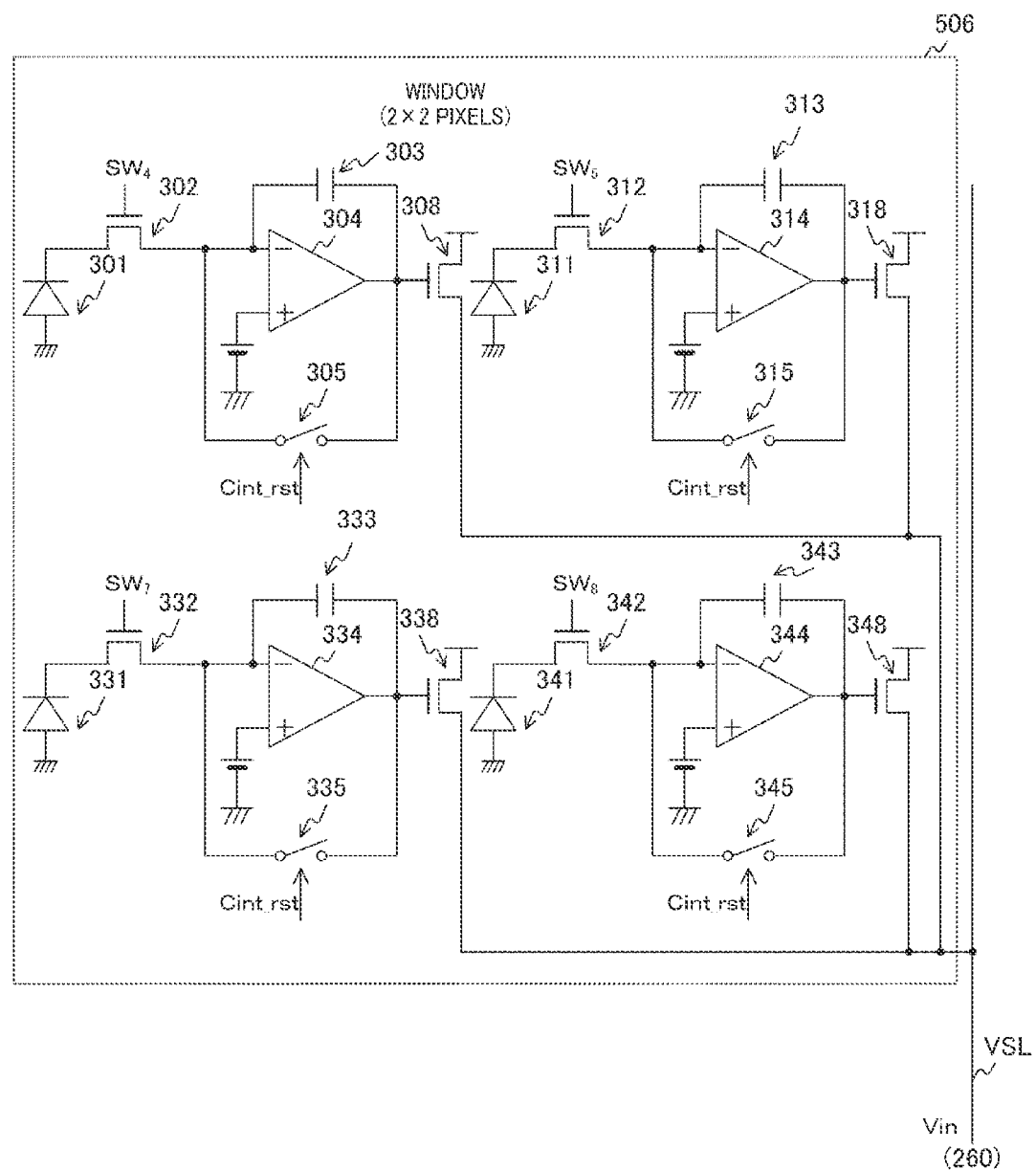
FIG. 17 is a circuit diagram illustrating a configuration example of a window in the first modification of the first embodiment of the present technology.

FIG. 17 is a circuit diagram illustrating a configuration example of the window 506 in the first modification of the first embodiment of the present technology. In the window 506, amplification transistors 308, 318, 338 and 348 are further arranged. The transfer transistor for external transfer is omitted in the drawing.

The amplification transistor 308 is arranged on the pixel 300, and the amplification transistor 318 is arranged on the pixel 310. The amplification transistor 338 is arranged on the pixel 330, and the amplification transistor 348 is arranged on the pixel 340.

The gate of the amplification transistor 308 is connected to the output of the operational amplifier 304 to amplify the voltage of the capacitor 303. The amplification transistors 318, 338 and 348 likewise amplify the voltages of the corresponding capacitors. Then, the respective sources of these amplification transistors 308, 318, 338 and 348 are commonly connected to the vertical signal line VSL. With this connection configuration, a pixel signal corresponding to the maximum value of the respective charge amounts of the pixels 300, 310, 330, and 340 is output from the window 506. The circuit illustrated in the drawing is generally called a winner-take-all circuit or the like, and has a simple source follower circuit configuration.

The configuration of other windows, such as the windows 507, 508 and 509, is similar to that of the window 506.

Figure 18:
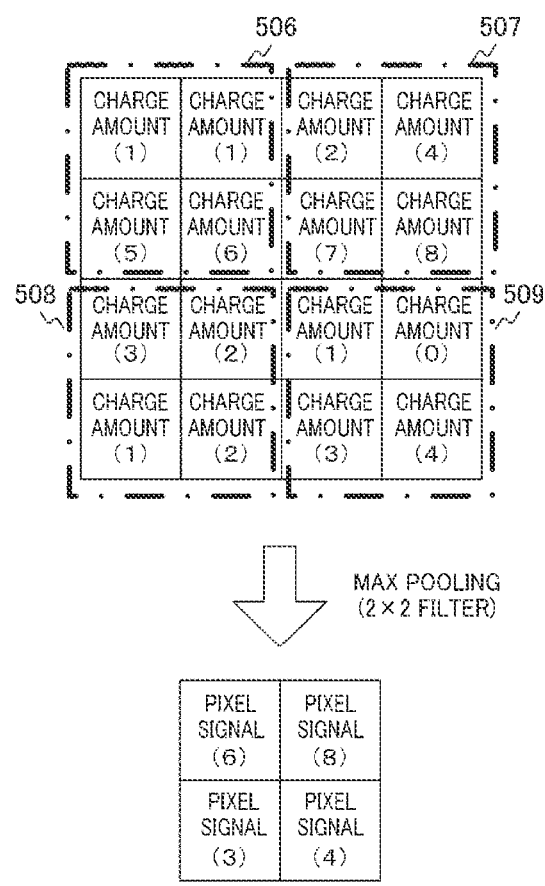
FIG. 18 is a diagram for explaining a pooling process in the first modification of the first embodiment of the present technology.

FIG. 18 is a diagram for explaining the pooling process in the first modification of the first embodiment of the present technology. It is assumed that the respective charge amounts of the four pixels in the window 506 are "1", "1", "5" and "6", and the respective charge amounts of the four pixels in the window 507 are "2" and "4", "7" and "8". It is assumed that the respective charge amounts of the four pixels in the window 508 are "3", "2", "1" and "2", and the respective charge amounts of the four pixels in the window 509 are "1", "0", "3" and "4".

In this case, each window outputs a pixel signal corresponding to the maximum value of the charge amounts. That is, the window 506 outputs a pixel signal corresponding to the charge amount "6", and the window 507 outputs a pixel signal corresponding to the charge amount "8". The window 508 outputs a pixel signal corresponding to the charge amount "3", and the window 509 outputs a pixel signal corresponding to the charge amount "4".

The number of pieces of data can be reduced to ¼ by the process illustrated in the drawing. By reducing the number of pieces of data, the signal processing cost in the subsequent stage can be further reduced. In particular, when the signal processing unit 260 performs AD conversion, the power and circuit size thereof can be reduced. In general, since the AD conversion cost accounts for a large proportion of the entire system, the power and time can be significantly reduced by reducing the signal processing cost of the signal processing unit 260.

The process of selecting and outputting statistics such as the maximum value for each window in this way is called a pooling process. In particular, the pooling process for selecting the maximum value is called max pooling.

In each window, the maximum value is selected as the statistic, but a statistic (average value or the like) other than the maximum value can also be selected. Further, although the size of the window is 2 rows×2 columns, the size of the window is not limited to 2 rows×2 columns.

As described above, according to the first modification of the first embodiment of the present technology, since each of the windows outputs a pixel signal corresponding to the statistic (maximum value or the like) of the amount of charge of each pixel, the number of pieces of data can be reduced as compared with the case where the pixel signal is output for each pixel.

Second Modification

In the first embodiment described above, the row scanning circuit 210 starts nine exposures at different timings from each other, but in this configuration, the difference in exposure time between the exposures may increase. In this case, shake called blur may occur in the image data due to the difference in the exposure time. The row scanning circuit 210 of the second modification of the first embodiment is different from the first embodiment in that nine exposures are started at the same timing.

Figure 19:
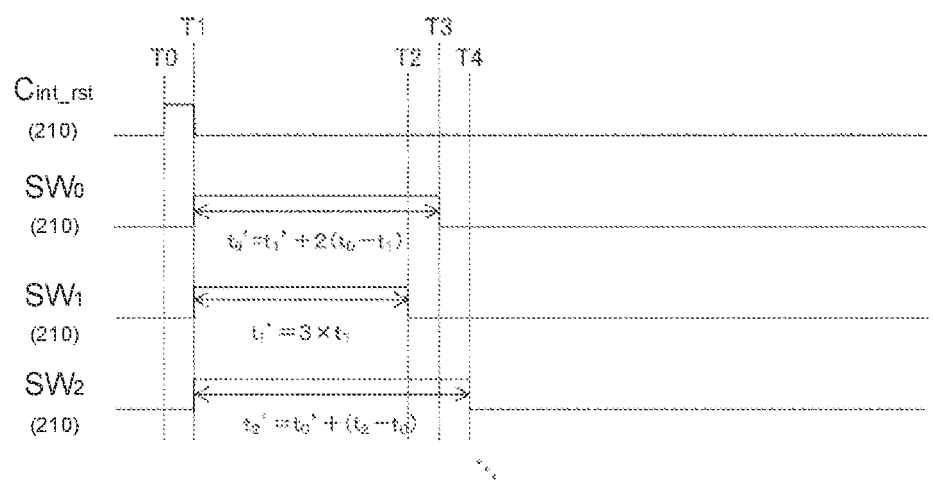
FIG. 19 is a timing chart illustrating an example of the operation of the solid-state imaging element in a second modification of the first embodiment of the present technology.

FIG. 19 is a timing chart illustrating an example of the operation of the solid-state imaging element 200 in the second modification of the first embodiment of the present technology. In the second modification of the first embodiment, the row scanning circuit 210 starts generation (in other words, exposure) of charge at the same timing for all pixels by setting the transfer signals $SW_0$ to $SW_9$ to a high level at the timing T1.

The row scanning circuit 210 calculates the exposure times $t_0'$ to $t_9'$ in advance before exposure from the exposure times $t_0$ to $t_9$ according to the weighting coefficients $w_0$ to $w_9$ by nine simultaneous equations. For the sake of simplicity, the case where the exposure start timings are aligned only for the first three times is considered. In this case, the exposure times $t_0'$ to $t_2'$ are calculated by the following three simultaneous equations.

$$t_0' = t_1' + 2(t_0 - t_1)$$
$$t_1' = 3 \times t_1$$
$$t_2' = t_0' + (t_2 - t_0)$$

The signal processing unit 260 or the image processing unit 290 in the subsequent stage sets the pixel signals corresponding to the exposure times $t_0'$ to $t_2'$ to $Vin_0'$ to $Vin_2'$, and calculates the pixel signals $Vin_0$ to $Vin_2$ corresponding to the exposure times $t_0$ to $t_2$ by solving the following simultaneous equations.

$$Vin_0' = Vin_1' + 2(Vin_0 - Vin_1)$$
$$Vin_1' = 3 \times Vin_1$$
$$Vin_2' = Vin_0' + (Vin_2 - Vin_0)$$

When aligning the nine exposure start timings, the signal processing unit 260 and the like may calculate the pixel signals corresponding to the exposure time $t_0'$ to $t_9'$ from the pixel signals corresponding to the exposure times $t_0$ to $t_9$ by solving the nine simultaneous equations.

As described above, by aligning the exposure start timings, it is possible to reduce the difference in exposure time between the nine exposures. In this way, deterioration in image quality of image data due to the difference in exposure time can be suppressed.

The first modification can be applied to the second modification of the first embodiment.

As described above, according to the second modification of the first embodiment of the present technology, the row scanning circuit 210 starts the exposure at the same timing for all the pixels, so that it is possible to reduce the difference in exposure time between the nine exposures as compared with the case where the exposure is started at different timings. In this way, deterioration in image quality due to the difference in exposure time can be suppressed.

2. Second Embodiment

In the first embodiment described above, the pixels are arranged in a two-dimensional lattice pattern in the pixel array unit 220, but in this arrangement, the size of the kernel cannot be made smaller than 3 rows×3 columns. The solid-state imaging element 200 of the second embodiment is different from the first embodiment in that the size of the kernel is reduced by arranging the pixels in a honeycomb pattern.

Figure 20:
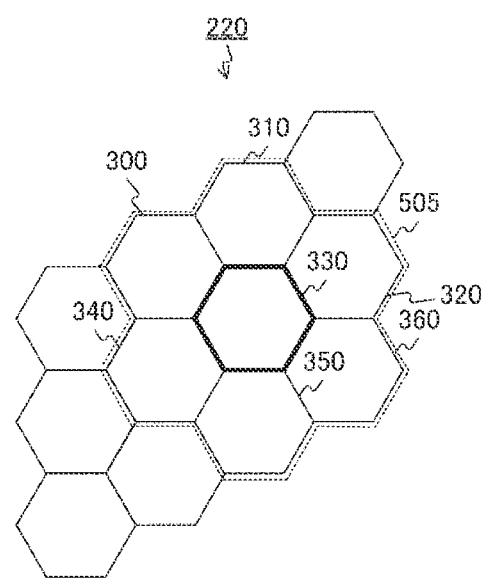
FIG. 20 is a diagram illustrating a configuration example of a pixel array unit according to a second embodiment of the present technology.

FIG. 20 is a diagram illustrating a configuration example of the pixel array unit 220 according to the second embodiment of the present technology. In the pixel array unit 220, a plurality of pixels such as pixels 300, 310, 320, 330, 340, 350, and 360 are arranged in a honeycomb pattern.

Further, the kernel is applied to seven pixels including a pixel of interest and six adjacent pixels therearound using each of all the pixels in the pixel array unit 220 as the pixel of interest. For example, focusing on the pixel 330, the pixels 300, 310, 320, 340, 350 and 360 are adjacent to the pixel 330. The kernel is applied to a pixel block 505 of seven pixels including the pixel of interest and six adjacent pixels therearound. Moreover, the number of weighting coefficients in the kernel is seven.

Similarly, when focusing on the pixel 340, the kernel is applied to the pixel 340 and the six pixels (the pixel 330 and the like) adjacent to the pixel 340. The same applies to other pixels.

The adjacent pixel (the pixel 300 or the like) generates an amount of charge corresponding to the weighting coefficient corresponding to the adjacent pixel under the control of the row scanning circuit 210 and transfers the charge to the pixel of interest. The pixel of interest (the pixel 330 or the like) generates an amount of charge corresponding to the weighting coefficient corresponding to the pixel of interest under the control of the row scanning circuit 210, and accumulates the charge together with the transferred charge.

As illustrated in the drawing, by arranging the pixels in a honeycomb pattern and forming a kernel including seven weighting coefficients, it is possible to reduce the number of weighting coefficients from nine to seven while maintaining sufficient spatial information. This facilitates the realization of CNNs in a two-dimensional to three-dimensional structure with respect to circuits, devices, optical calculations, and the like, and as a result, the overall performance of power, size, and speed can be improved.

The honeycomb-shaped arrangement can be applied to when CNN is configured and executed by software implementation using general-purpose computing means such as GPU (Graphics Processing Unit) as a general-purpose CNN kernel with the minimum configuration that replaces the general 3 row×3 column kernel.

Figure 21:
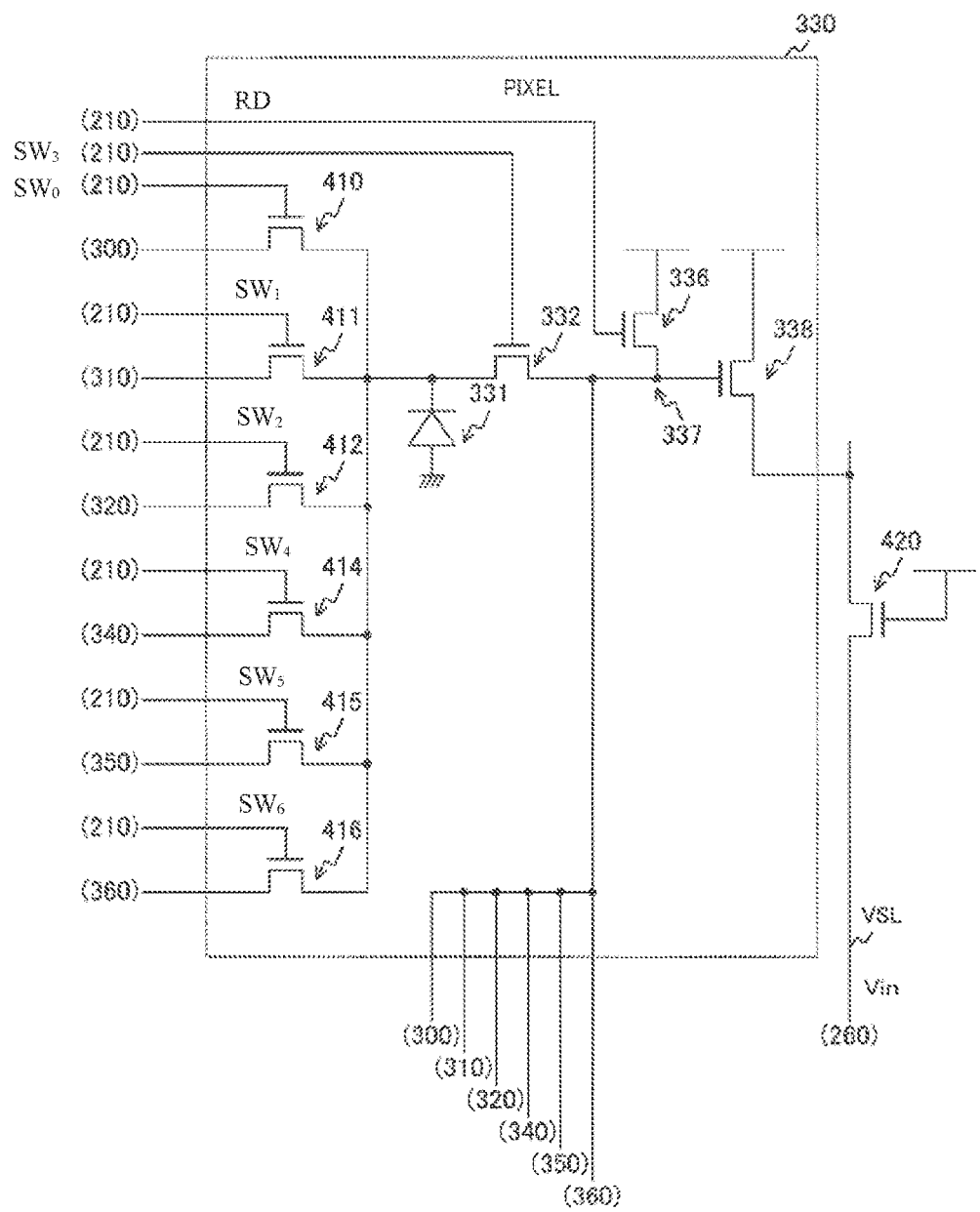
FIG. 21 is a circuit diagram illustrating a configuration example of a pixel according to the second embodiment of the present technology.

FIG. 21 is a circuit diagram illustrating a configuration example of the pixel 330 according to the second embodiment of the present technology. The pixel 330 of the second embodiment includes a photoelectric conversion element 331, a transfer transistor 332, a reset transistor 336, a floating diffusion layer 337, an amplification transistor 338, and transfer transistors 410, 411, 412, 414, 415 and 416.

The photoelectric conversion element 331 generates charge by photoelectric conversion.

The transfer transistor 332 internally transfers the charge from the photoelectric conversion element 331 to the floating diffusion layer 337 according to the transfer signal $SW_3$ from the row scanning circuit 210.

The transfer transistor 410 externally transfers the charge from the photoelectric conversion element 331 to the adjacent pixel 300 according to the transfer signal $SW_0$ from the row scanning circuit 210. The transfer transistor 411 externally transfers the charge from the photoelectric conversion element 331 to the adjacent pixel 310 according to the transfer signal $SW_1$ from the row scanning circuit 210. The transfer transistor 412 externally transfers the charge from the photoelectric conversion element 331 to the adjacent pixel 320 according to the transfer signal $SW_2$ from the row scanning circuit 210. The transfer transistor 414 externally transfers the charge from the photoelectric conversion element 331 to the adjacent pixel 340 according to the transfer signal $SW_4$ from the row scanning circuit 210.

The transfer transistor 415 externally transfers the charge from the photoelectric conversion element 331 to the adjacent pixel 350 according to the transfer signal $SW_5$ from the row scanning circuit 210. The transfer transistor 416 externally transfers the charge from the photoelectric conversion element 331 to the adjacent pixel 360 according to the transfer signal $SW_6$ from the row scanning circuit 210.

The floating diffusion layer 337 accumulates and holds the charge internally transferred by the transfer transistor 332 and the charge externally transferred by the pixels 300, 310, 320, 340, 350 and 360. The floating diffusion layer 337 is an example of a charge accumulation unit described in the claims.

The amplification transistor 338 amplifies the voltage of the floating diffusion layer 337 and outputs the voltage as a pixel signal to the vertical signal line VSL.

The reset transistor 336 initializes the charge amount of the floating diffusion layer 337 according to the reset signal RD from the row scanning circuit 210.

The configuration of pixels (the pixel 300 and the like) other than pixel 330 is the same as that of the pixel 330.

Instead of the floating diffusion layer 337, the amplification transistor 338, and the reset transistor 336, the capacitor 343, the operational amplifier 344, and the reset switch 345 may be arranged as in the first embodiment.

As illustrated in the drawing, by arranging the pixels in a honeycomb pattern, the number of transfer destination adjacent pixels is reduced from eight pixels to six pixels, so that the number of transfer transistors can be reduced by 2 for each pixel. When the total number of pixels is I×J, I×J×2 transfer transistors can be reduced.

Figure 22:
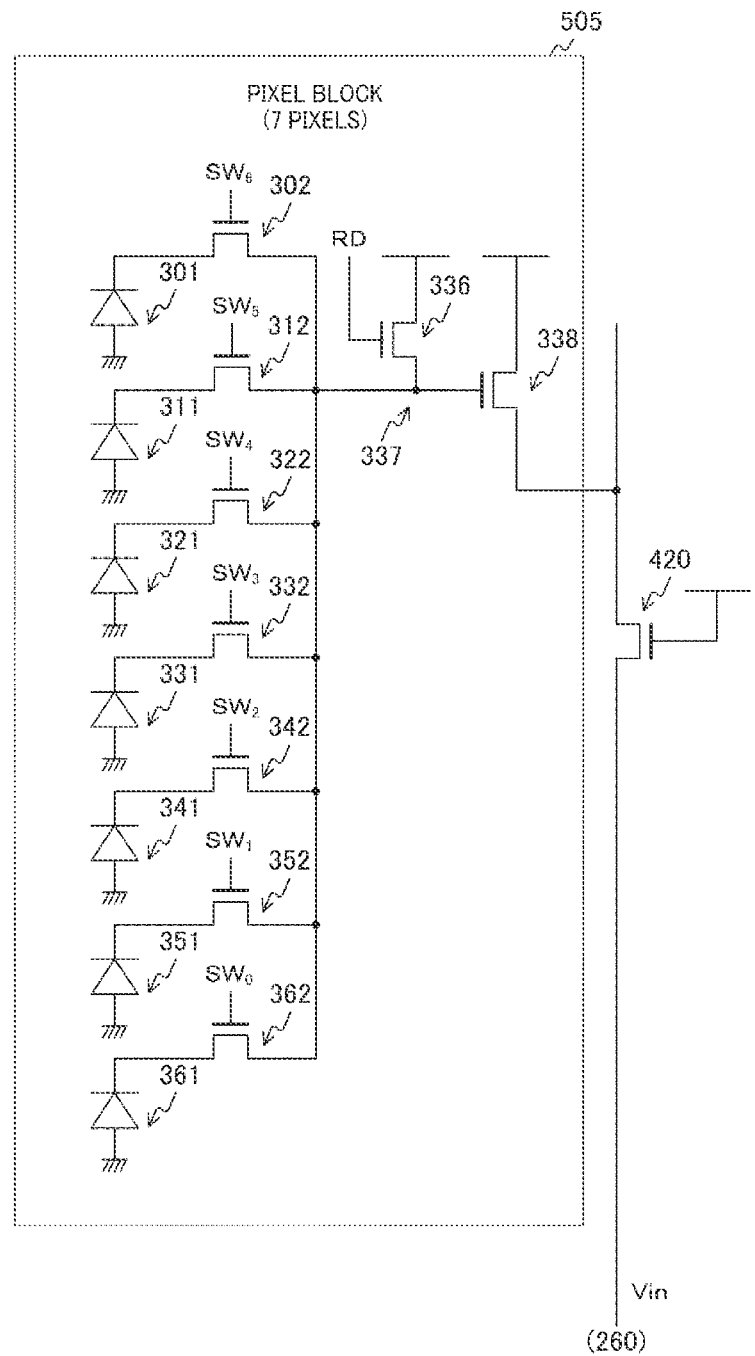
FIG. 22 is a circuit diagram illustrating a configuration example of a pixel block according to the second embodiment of the present technology.

FIG. 22 is a circuit diagram illustrating a configuration example of the pixel block 505 according to the second embodiment of the present technology. Pixels 300, 310, 320, 330, 340, 350 and 360 are arranged in the pixel block 505 of the second embodiment.

In the pixel block 505, photoelectric conversion elements 301, 311, 321, 331, 341, 351 and 361 are arranged. Further, transfer transistors 302, 312, 322, 332, 342, 352 and 362, a reset transistor 336, a floating diffusion layer 337 and an amplification transistor 338 are arranged.

In the drawing, the floating diffusion layer, the amplification transistor, and the reset transistor in the pixels other than the pixel 340 are omitted. The transfer transistors 410, 411, 412, 414, 415 and 416 in the pixel 340 are omitted.

In the image recognition mode, using the pixel 330 as the pixel of interest, the transfer transistor 302 and the like of the pixels adjacent to the pixel of interest externally transfer an amount of charge corresponding to the corresponding weighting coefficient from the corresponding photoelectric conversion elements 301 and the like to the floating diffusion layer 337 of the pixel of interest.

The transfer transistor 332 in the pixel of interest (the pixel 330) internally transfers an amount of charge corresponding to the corresponding weighting coefficient from the corresponding photoelectric conversion element 331 to the floating diffusion layer 337. The floating diffusion layer 337 accumulates these charges. In this way, the charges generated by the seven pixels in the pixel block 505 are added. Since each of the transferred charge amounts is the amount corresponding to the weighting coefficient, the amount of accumulated charge of the floating diffusion layer 337 is the amount corresponding to the result of a product-sum operation convoluted using the kernel including seven weighting coefficients.

Figure 23:
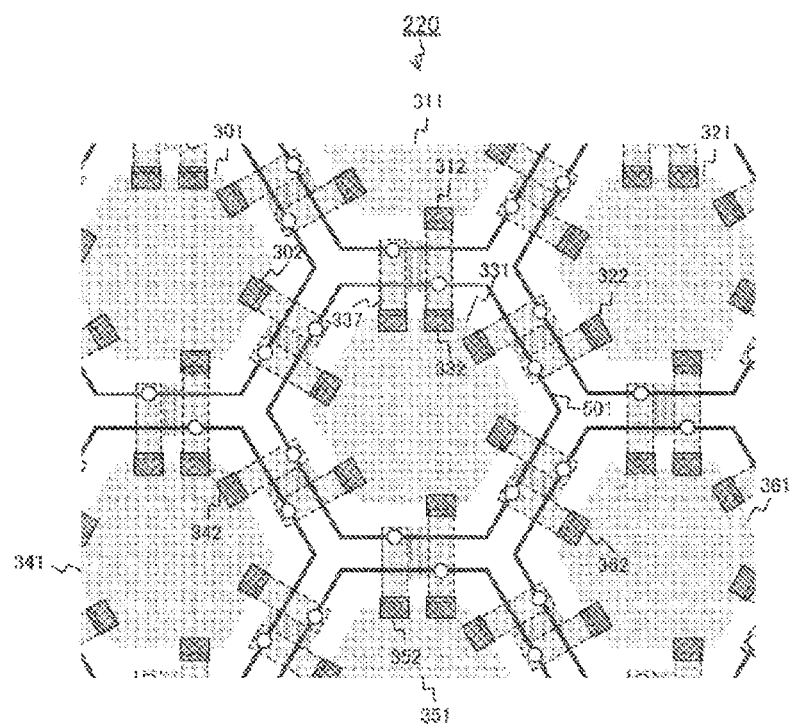
FIG. 23 is a diagram illustrating an example of a layout of elements in a pixel array unit according to the second embodiment of the present technology.

FIG. 23 is a diagram illustrating an example of the layout of the elements in the pixel array unit 220 according to the second embodiment of the present technology. The transfer transistors 302, 312, 322, 342, 352 and 362 are arranged between the signal line 501 and the six photoelectric conversion elements 301, 311, 321, 341, 351 and 361 around the photoelectric conversion element 331. Further, the transfer transistor 332 is arranged between the photoelectric conversion element 331 and the signal line 501.

The signal line 501 is wired so as to surround the photoelectric conversion element 331 and is connected to the floating diffusion layer 337. The reset transistor 336 and the amplification transistor 338 are omitted in the drawing.

Figure 24:
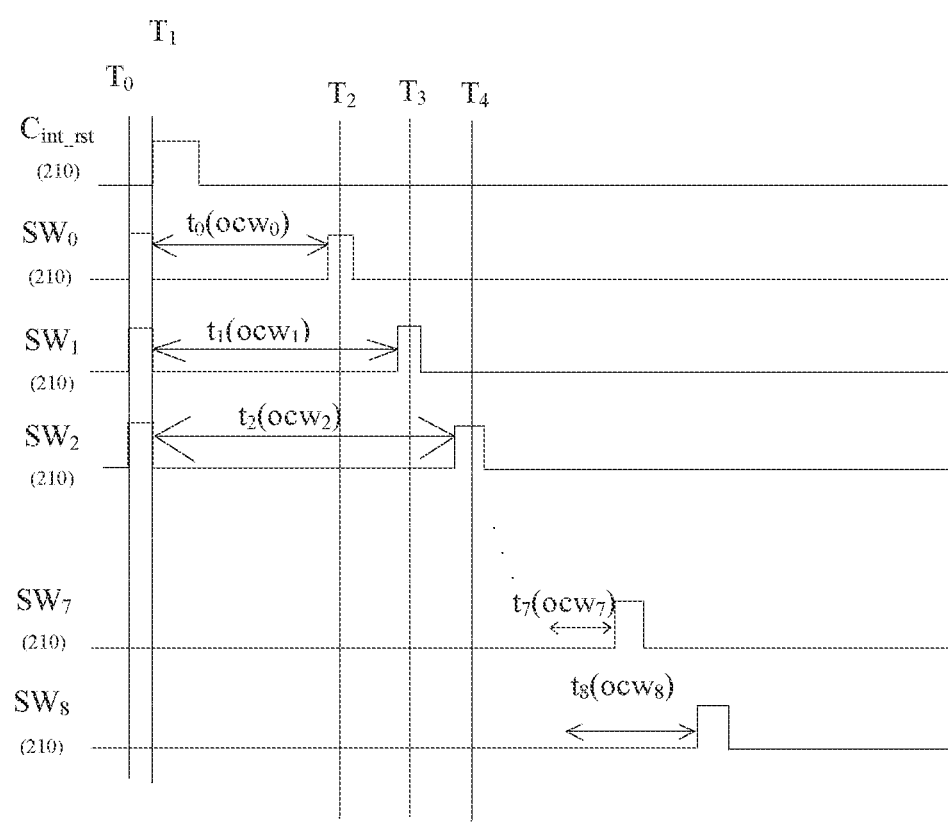
FIG. 24 is a timing chart illustrating an example of the operation of the solid-state imaging element according to the second embodiment of the present technology.

FIG. 24 is a timing chart illustrating an example of the operation of the solid-state imaging element 200 according to the second embodiment of the present technology. In the image recognition mode, the row scanning circuit 210 simultaneously supplies the transfer signals $SW_0$ to $SW_6$ to all the pixels within the period of the timings T0 to T1, and supplies the reset signal RD to all the pixels at the timing T1. In this way, the floating diffusion layers of all pixels are initialized to a desired potential.

Then, the row scanning circuit 210 supplies the transfer signal $SW_0$ at the timing T2 when the exposure time to has elapsed from the timing T1. Assuming that the amount of current due to photoelectric conversion when the kernel is not applied is $I_{PD}$, the amount of charge of $I_{PD} \times t_0$ is generated in the photoelectric conversion element during the period of timings T1 to T2 and is accumulated in the floating diffusion layer.

Subsequently, the row scanning circuit 210 supplies the transfer signal $SW_1$ at the timing T3 when the exposure time $t_1$ has elapsed from the timing T2, and supplies the transfer signal $SW_2$ at the timing T4 when the exposure time $t_2$ has elapsed from the timing T3. Hereinafter, similarly, the transfer signals $SW_3$ to $SW_6$ are sequentially supplied at the timing when the corresponding exposure time elapses.

By the above-mentioned seven exposures and transfers, the floating diffusion layers of all the pixels hold the results of convolution operation on the respective charge amounts of the pixel and the six pixels therearound according to the weighting coefficient of the kernel.

By arranging the pixels in a honeycomb pattern in this way, the number of pixels to which the kernel is applied is reduced from nine pixels to seven pixels, so that the number of exposures can be reduced from nine times to seven times. In this way, the total exposure time can be shortened.

Figure 25:
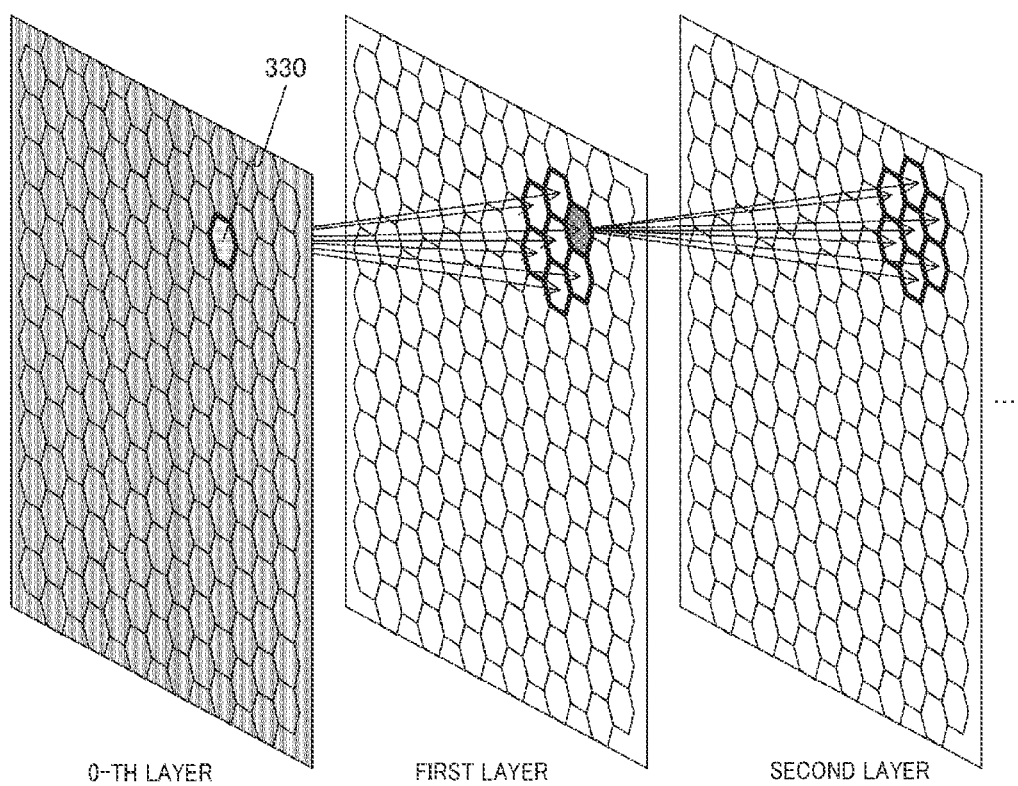
FIG. 25 is a diagram for explaining a CNN in the second embodiment of the present technology.

FIG. 25 is a diagram for explaining CNN in the second embodiment of the present technology. When the image recognition mode is set, in the 0-th layer, each pixel generates an amount of charge corresponding to the weighting coefficient and transfers the charge to seven pixels including itself. In the drawing, the arrow indicates the transfer direction. In this way, the convolution operation of the 0-th layer is realized. The processing result of the 0-th layer is AD-converted by the signal processing unit 260 to generate digital image data.

The image processing unit 290 performs a convolution operation of the first layer on the digital image data in the same manner as in the comparative example. The processing of the second and subsequent layers is executed in the same manner as in the comparative example with respect to the processing result of the layer in the previous stage.

As described above, according to the second embodiment of the present technology, since the pixels are arranged in a honeycomb pattern, the number of adjacent pixels is reduced from eight pixels to six pixels as compared with the case where the pixels are arranged in a two-dimensional lattice pattern. In this way, the circuit scale of the pixels can be reduced and the total exposure time can be shortened.

Modification

In the second embodiment described above, all the pixels output the result of the convolution operation as it is, but in this configuration, the data size of the image data increases as the number of pixels increases. The solid-state imaging element 200 of the modification of the second embodiment is different from the second embodiment in that the pooling process is further executed.

The pixel array unit 220 of the modification of the second embodiment is divided by a plurality of windows composed of a predetermined number of (4 or the like) pixels.

Figure 26:
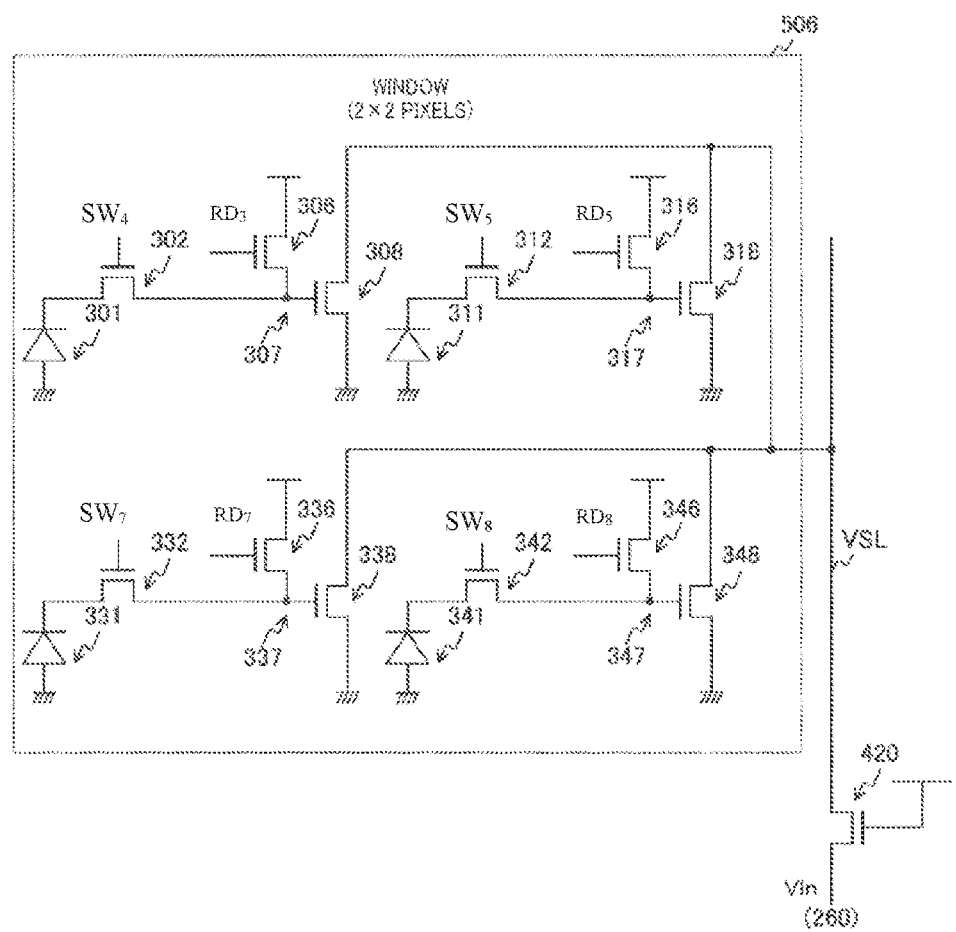
FIG. 26 is a circuit diagram illustrating a configuration example of a window in a modification of the second embodiment of the present technology.

FIG. 26 is a circuit diagram illustrating a configuration example of the window 506 in the modification of the second embodiment of the present technology. In the window 506, the drains of the amplification transistors 308, 318, 338 and 348 are commonly connected to the vertical signal line VSL. With this connection configuration, a pixel signal corresponding to the maximum value of the respective charge amounts of the pixels 300, 310, 330, and 340 is output from the window 506.

It should be noted that the second modification of the first embodiment in which the exposure start timing is aligned can also be applied to the modification of the second embodiment.

According to the modification of the second embodiment of the present technology, each of the windows in the honeycomb-shaped arrangement outputs a pixel signal corresponding to the statistic (maximum value or the like) of the amount of charge of each pixel, so that the number of pieces of data can be reduced as compared with the case where a pixel signal is output for each pixel.

3. Third Embodiment

In the first embodiment described above, the transfer transistor is arranged for each pixel to realize the convolution operation, but in this configuration, the circuit scale for each pixel is increased as compared with the case where the convolution operation is not performed. The imaging device 100 of the third embodiment is different from that of the first embodiment in that the convolution operation is realized by shifting the position of the solid-state imaging element 200 in pixel units.

Figure 27:
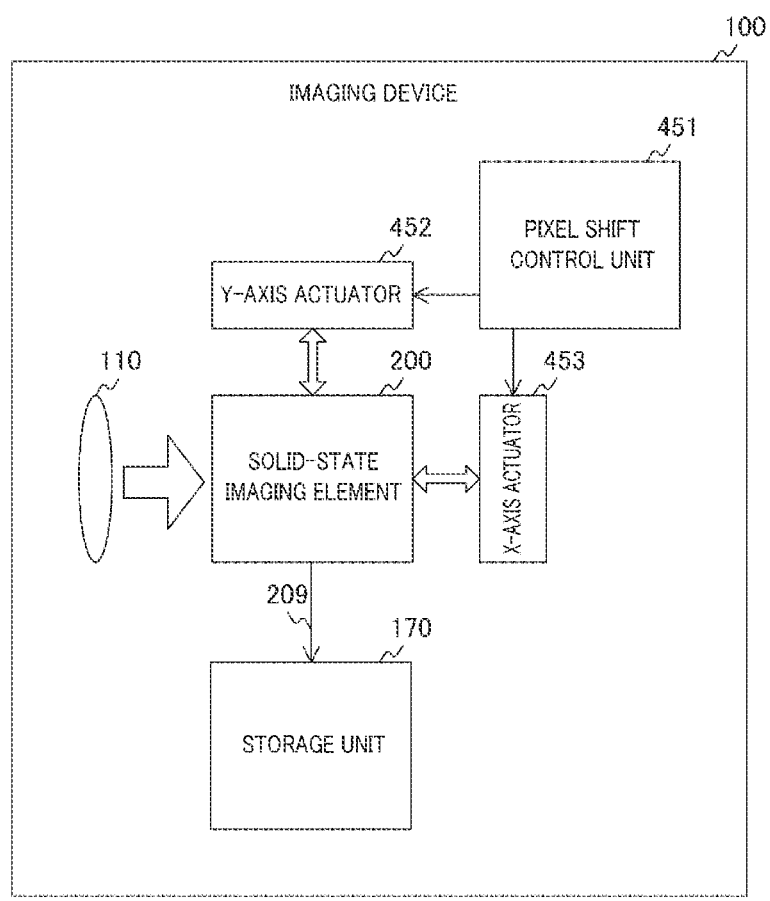
FIG. 27 is a block diagram illustrating a configuration example of an imaging device according to a third embodiment of the present technology.

FIG. 27 is a block diagram illustrating a configuration example of the imaging device 100 according to the third embodiment of the present technology. The imaging device 100 of the third embodiment includes an optical unit 110, a solid-state imaging element 200, a pixel shift control unit 451, a Y-axis actuator 452, an X-axis actuator 453, and a storage unit 170.

The configuration of the optical unit 110 and the storage unit 170 of the second embodiment is the same as that of the first embodiment.

The X-axis actuator 453 changes the horizontal position of the solid-state imaging element 200 to a position different from the initial position in pixel units under the control of the pixel shift control unit 451.

The Y-axis actuator 452 changes the vertical position of the solid-state imaging element 200 to a position different from the initial position in pixel units under the control of the pixel shift control unit 451. The X-axis actuator 453 and the Y-axis actuator 452 are realized by, for example, a piezoelectric element.

The X-axis actuator 453 and the Y-axis actuator 452 are examples of an actuator described in the claims.

In the image recognition mode, the pixel shift control unit 451 controls the X-axis actuator 453 and the Y-axis actuator 452 to change the position of the solid-state imaging element 200 in pixel units. The position of the solid-state imaging element 200 is changed in pixel units in eight directions about the initial position, for example. At the initial position, the solid-state imaging element 200 generates an amount of charge for each pixel according to the weighting coefficient of the pixel of interest. Further, each time the position is changed, the solid-state imaging element 200 generates an amount of charge for each pixel according to the weighting coefficient of the adjacent pixel related to the position.

On the other hand, in the normal mode, the pixel shift control unit 451 keeps the position of the solid-state imaging element 200 at the initial position, and the solid-state imaging element 200 acquires image data in synchronization with the vertical synchronization signal.

Figure 28:
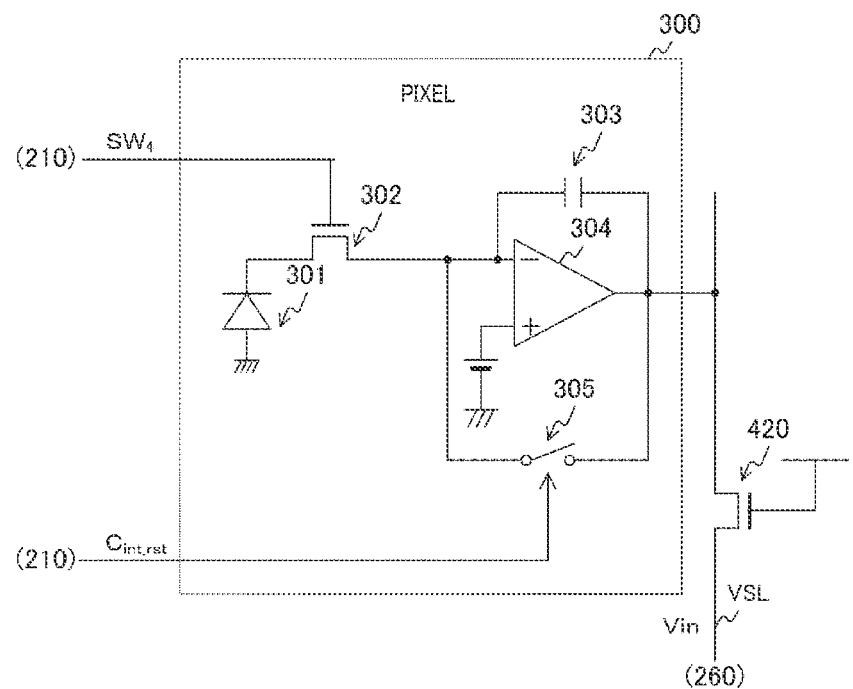
FIG. 28 is a circuit diagram illustrating a configuration example of a pixel according to the third embodiment of the present technology.

FIG. 28 is a circuit diagram illustrating a configuration example of the pixel 300 according to the third embodiment of the present technology. The pixel 300 of the third embodiment is different from that of the first embodiment in that the transfer transistors 410, 411, 412, 413, 415, 416, 417 and 418 for transferring charge to surrounding pixels are not arranged.

Figure 29:
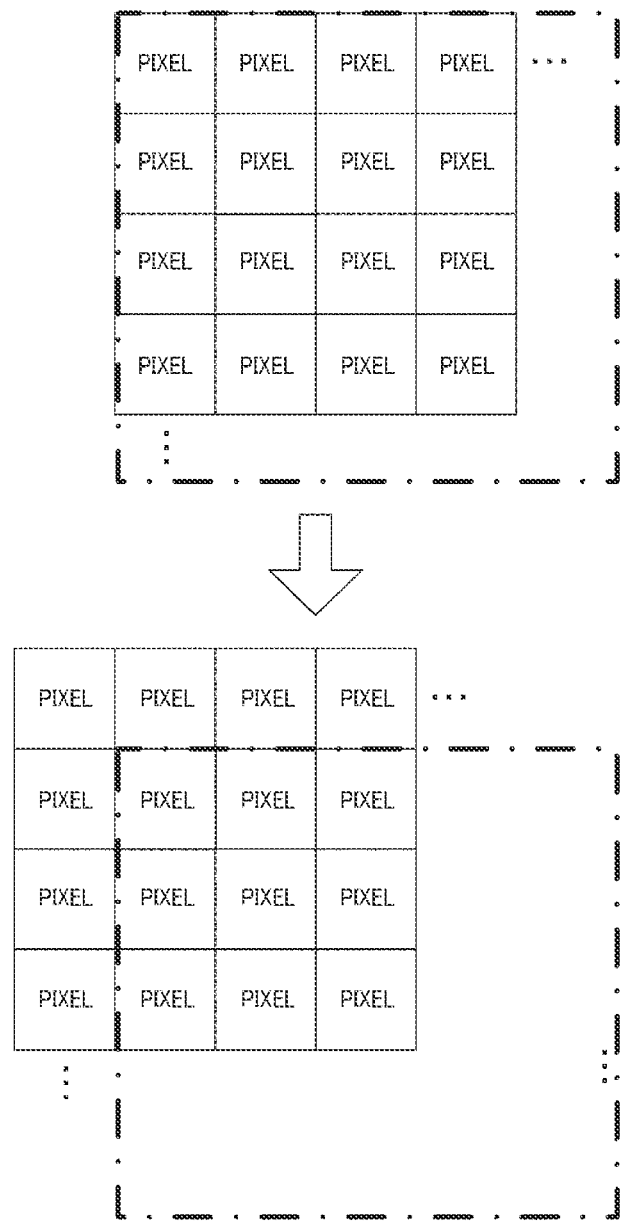
FIG. 29 is a diagram for explaining the 0-th and first exposure control in the third embodiment of the present technology.

FIG. 29 is a diagram for explaining the 0-th and first exposure control in the third embodiment of the present technology. In the drawing, the alternate long and short dash line indicates the outer circumference of the pixel array unit 220 of the solid-state imaging element 200 at the initial position.

At the initial position, the row scanning circuit 210 causes all the pixels to generate an amount of charge corresponding to the weighting coefficient $w_4$ of the pixel of interest. Then, the X-axis actuator 453 and the Y-axis actuator 452 shift the solid-state imaging element 200 to the left by one pixel and upward by one pixel from the initial position. The row scanning circuit 210 causes all the pixels to generate an amount of charge corresponding to the weighting coefficient $w_0$ corresponding to the adjacent pixel on the upper-left corner.

Figure 30:
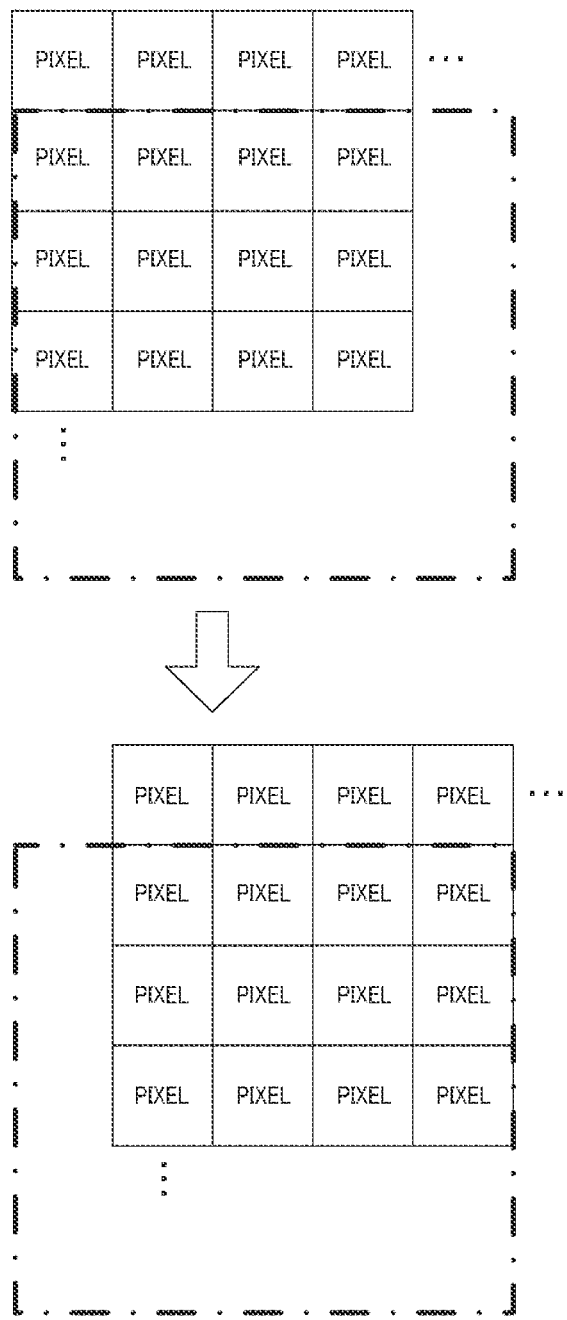
FIG. 30 is a diagram for explaining the second and third exposure control in the third embodiment of the present technology.

FIG. 30 is a diagram for explaining the second and third exposure control in the third embodiment of the present technology. The X-axis actuator 453 shifts the solid-state imaging element 200 to the right by one pixel from the state of being shifted to the upper-left corner to move the solid-state imaging element 200 to an upper position from the initial position. The row scanning circuit 210 causes all the pixels to generate an amount of charge corresponding to the weighting coefficient $w_1$ corresponding to the adjacent pixel on the upper side.

Then, the X-axis actuator 453 shifts the solid-state imaging element 200 to the right by one pixel from the upwardly shifted state to move the solid-state imaging element 200 to an upper-right position from the initial position. The row scanning circuit 210 causes all the pixels to generate an amount of charge corresponding to the weighting coefficient $w_2$ corresponding to the adjacent pixel on the upper-right corner.

Hereinafter, similarly, the X-axis actuator 453 and the Y-axis actuator 452 shift the solid-state imaging element 200 sequentially to the left side, the right side, the lower-left corner, the lower side, and the lower right corner, and all the pixels generate an amount of charge corresponding to the result of a product-sum operation convoluted using the kernel of 3 rows×3 columns.

In addition, the first modification and the second modification of the first embodiment can be applied to the third embodiment.

As described above, according to the third embodiment of the present technology, each time the position of the solid-state imaging element 200 is changed in pixel units, the pixel generates an amount of charge corresponding to the weighting coefficient, so that the convolution operation can be realized without transferring charge between pixels. This eliminates the need for the transfer transistor 410 or the like for transferring charges between pixels, and the circuit scale of the pixels can be reduced accordingly.

4. Application Example to Moving Body

The technology (the present technology) according to the present disclosure can be applied to various products. For example, the technology according to the present disclosure may be realized as a device mounted on any type of mobile body such as an automobile, an electric vehicle, a hybrid electric vehicle, a motorcycle, a bicycle, a personal mobility, an airplane, a drone, a ship, and a robot.

Figure 31:
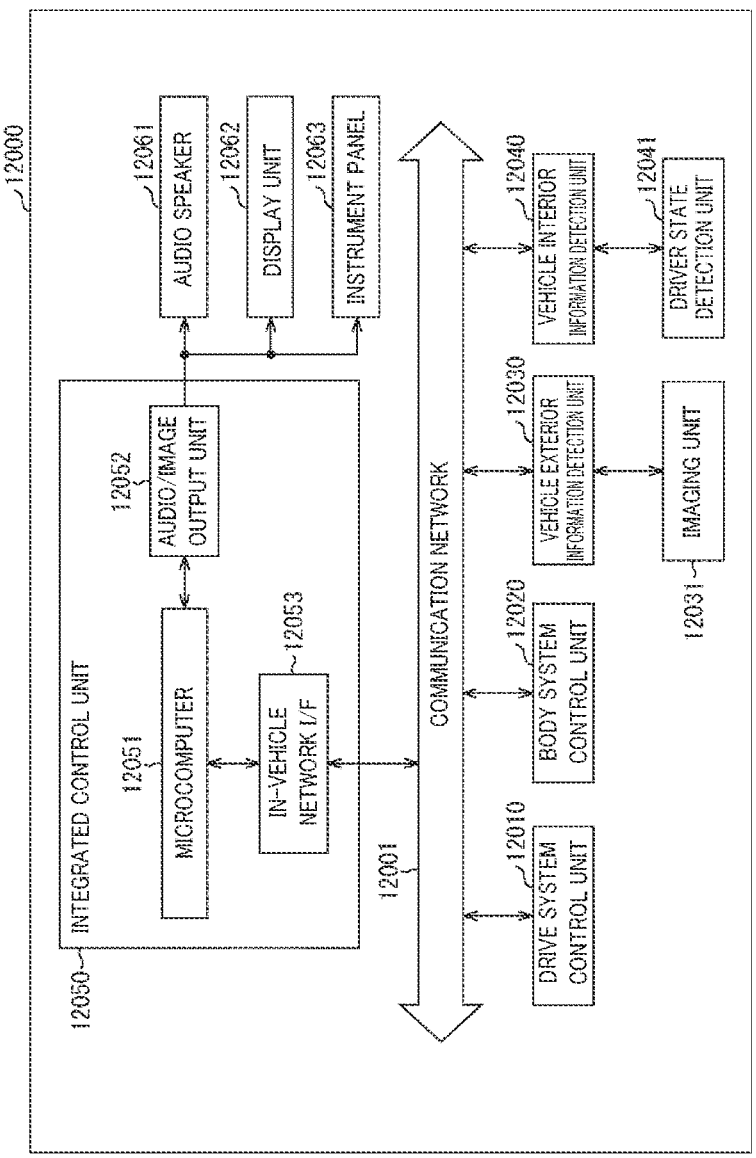
FIG. 31 is a block diagram illustrating an example of a schematic configuration of a vehicle control system.

FIG. 31 is a block diagram illustrating a schematic configuration example of a vehicle control system which is an example of a moving body control system to which the technology according to the present disclosure can be applied.

A vehicle control system 12000 includes a plurality of electronic control units connected via a communication network 12001. In the example illustrated in FIG. 31, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio/image output unit 12052, and an in-vehicle network interface (I/F) 12053 are illustrated.

The drive system control unit 12010 controls the operation of devices related to the drive system of the vehicle according to various programs. For example, the drive system control unit 12010 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls operations of various devices mounted on the vehicle body according to various programs. For example, the body system control unit 12020 functions as a control device of a keyless entry system, a smart key system, a power window device, or various lamps such as a head lamp, a back lamp, a brake lamp, a turn signal, or a fog lamp. In this case, radio waves transmitted from a portable device that substitutes for a key or signals of various switches can be input to the body system control unit 12020. The body system control unit 12020 receives input of these radio waves or signals, and controls a door lock device, a power window device, a lamp, and the like of the vehicle.

The vehicle exterior information detection unit 12030 detects information outside the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image of the outside of the vehicle, and receives the captured image. The vehicle exterior information detection unit 12030 may perform object detection processing or distance detection processing of a person, a vehicle, an obstacle, a sign, a character on a road surface, or the like on the basis of the received image.

The imaging unit 12031 is an optical sensor that receives light and outputs an electrical signal corresponding to the amount of received light. The imaging unit 12031 can output the electrical signal as an image or can output the electrical signal as distance measurement information. Furthermore, the light received by the imaging unit 12031 may be visible light or invisible light such as infrared rays.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that images the driver, and the vehicle interior information detection unit 12040 may calculate the degree of fatigue or the degree of concentration of the driver or may determine whether the driver is dozing off on the basis of the detection information input from the driver state detection unit 12041.

The microcomputer 12051 can calculate a control target value of the driving force generation device, the steering mechanism, or the braking device on the basis of the information inside and outside the vehicle acquired by the vehicle exterior information detection unit 12030 or the vehicle interior information detection unit 12040, and output a control command to the drive system control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, or the like.

Furthermore, the microcomputer 12051 can perform cooperative control for the purpose of automatic driving or the like in which the vehicle autonomously travels without depending on the operation of the driver by controlling the driving force generation device, the steering mechanism, the braking device, or the like on the basis of the information around the vehicle acquired by the vehicle exterior information detection unit 12030 or the vehicle interior information detection unit 12040.

Furthermore, the microcomputer 12051 can output a control command to the body system control unit 12020 on the basis of the vehicle exterior information acquired by the vehicle exterior information detection unit 12030. For example, the microcomputer 12051 can perform cooperative control for the purpose of preventing glare, such as switching from a high beam to a low beam, by controlling the headlamp according to the position of a preceding vehicle or an oncoming vehicle detected by the vehicle exterior information detection unit 12030.

The audio/image output unit 12052 transmits an output signal of at least one of a sound or an image to an output device capable of visually or audibly notifying an occupant of the vehicle or the outside of the vehicle of information. In the example of FIG. 31, an audio speaker 12061, a display unit 12062, and an instrument panel 12063 are illustrated as the output device. The display unit 12062 may include, for example, at least one of an on-board display and a head-up display.

Figure 32:
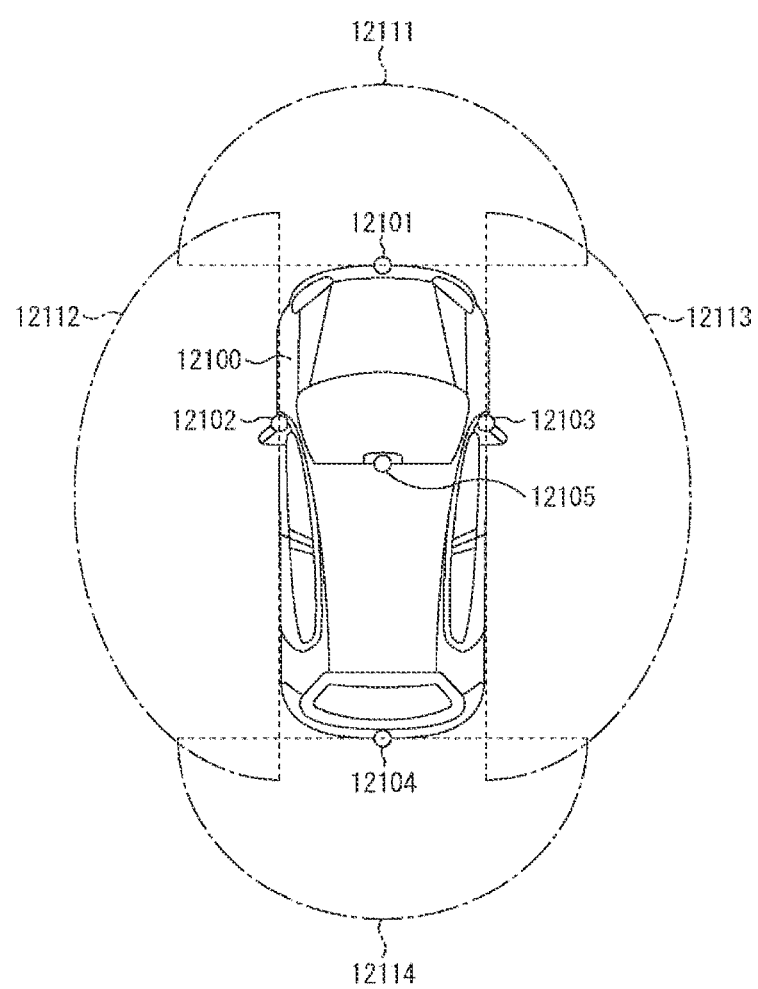
FIG. 32 is diagram illustrating an example of installation positions of a vehicle exterior information detection unit and an imaging unit.

FIG. 32 is a diagram illustrating an example of positions at which the imaging unit 12031 is installed.

In FIG. 32, imaging units 12101, 12102, 12103, 12104, and 12105 are provided as the imaging unit 12031.

The imaging units 12101, 12102, 12103, 12104, and 12105 are provided, for example, at positions such as a front nose, a side mirror, a rear bumper, a back door, and an upper portion of a windshield in a vehicle interior of the vehicle 12100. The imaging unit 12101 provided at the front nose and the imaging unit 12105 provided at the upper portion of the windshield in the vehicle interior mainly acquire images in front of the vehicle 12100. The imaging units 12102 and 12103 provided at the side mirrors mainly acquire images of the sides of the vehicle 12100. The imaging unit 12104 provided on the rear bumper or the back door mainly acquires an image behind the vehicle 12100. The front images acquired by the imaging unit 12105 is mainly used for detecting a preceding vehicle, a pedestrian, an obstacle, a traffic light, a traffic sign, a lane, or the like.

FIG. 32 illustrates an example of imaging ranges of the imaging units 12101 to 12104. An imaging range 12111 indicates an imaging range of the imaging unit 12101 provided at the front nose, imaging ranges 12112 and 12113 indicate imaging ranges of the imaging units 12102 and 12103 provided at the side mirrors, respectively, and an imaging range 12114 indicates an imaging range of the imaging unit 12104 provided at the rear bumper or the back door. For example, by superimposing image data captured by the imaging units 12101 to 12104, an overhead view image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object in the imaging ranges 12111 to 12114 and a temporal change of the distance (relative speed with respect to the vehicle 12100) on the basis of the distance information obtained from the imaging units 12101 to 12104, thereby extracting, as a preceding vehicle, a three-dimensional object traveling at a predetermined speed (for example, 0 km/h or more) in substantially the same direction as the vehicle 12100, in particular, the closest three-dimensional object on a traveling path of the vehicle 12100. The microcomputer 12051 can set an inter-vehicle distance to be secured in advance in front of the preceding vehicle, and can perform automatic brake control (including follow-up stop control), automatic acceleration control (including follow-up start control), and the like. As described above, it is possible to perform cooperative control for the purpose of automatic driving or the like in which the vehicle autonomously travels without depending on the operation of the driver.

For example, on the basis of the distance information obtained from the imaging units 12101 to 12104, the microcomputer 12051 can classify and extract three-dimensional object data regarding three-dimensional objects into two-wheeled vehicles, ordinary vehicles, large vehicles, pedestrians, and other three-dimensional objects such as utility poles, and use the three-dimensional object data for automatic avoidance of obstacles. For example, the microcomputer 12051 identifies obstacles around the vehicle 12100 as obstacles that can be visually recognized by the driver of the vehicle 12100 and obstacles that are difficult to visually recognize. The microcomputer 12051 determines a collision risk indicating a risk of collision with each obstacle, and when the collision risk is equal to or greater than a set value and there is a possibility of collision, the microcomputer 12051 can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared light. For example, the microcomputer 12051 can recognize pedestrians by determining whether there are the pedestrians in images captured by the imaging units 12101 to 12104. The pedestrians are recognized, for example, in an order in which feature points in the images captured by the imaging units 12101 to 12104 serving as infrared cameras are extracted and an order in which a pattern matching process is performed on a series of feature points indicating the contour of an object to determine whether there is a pedestrian. When the microcomputer 12051 determines that there is the pedestrian in the images captured by the imaging units 12101 to 12104 and recognizes the pedestrian, the audio/image output unit 12052 controls the display unit 12062 such that a rectangular contour line for emphasizing the recognized pedestrian is superimposed and displayed. The audio/image output unit 12052 may control the display unit 12062 such that an icon or the like indicating the pedestrian is displayed at a desired position.

The example of the vehicle control system to which the technology according to the present disclosure is applied has been described above. The technology of the present disclosure can be applied to the imaging unit 12031 and the like in the above-described configuration. Specifically, the imaging device 100 in FIG. 1 can be applied to the imaging unit 12031. By applying the technology according to the present disclosure to the imaging unit 12031, it is possible to shorten the computation time of image recognition, so that the image recognition can be performed at a high speed, and the stability of the vehicle control system can be improved.

The above-described embodiments show examples for embodying the present technique, and matters in the embodiments and matters specifying the invention in the claims have a corresponding relationship with each other. Similarly, the matters specifying the invention in the claims and the matters in the embodiments of the present technique having the same name have a corresponding relationship with each other. However, the present technique is not limited to the embodiments and can be embodied by applying various modifications to the embodiments without departing from the gist thereof.

In addition, the effects described in the present specification are merely examples and are not intended as limiting, and other effects may be obtained.

The present technology can also be configured as described below.

(1) A solid-state imaging element including: a pixel array unit in which a plurality of pixels are arranged in a two-dimensional lattice pattern; a coefficient holding unit that holds a predetermined weighting coefficient correlated with each of a pixel of interest among the plurality of pixels and a predetermined number of adjacent pixels adjacent to the pixel of interest; and a scanning circuit that performs control so that the adjacent pixel generates an amount of charge corresponding to the weighting coefficient correlated with the adjacent pixel and transfers the charge to the pixel of interest and performs control so that the pixel of interest generates an amount of charge corresponding to the weighting coefficient correlated with the pixel of interest and accumulates the charge together with the transferred charge.

(2) The solid-state imaging element according to (1), wherein the plurality of pixels are arranged in a two-dimensional lattice pattern.

(3) The solid-state imaging element according to (1), wherein the plurality of pixels are arranged in a honeycomb pattern.

(4) The solid-state imaging element according to any one of (1) to (3), wherein each of the plurality of pixels includes: a photoelectric conversion element that generates the charge by photoelectric conversion; a charge holding portion that holds the charge; an internal transfer transistor that internally transfers the charge from the photoelectric conversion element to the charge holding portion; and the predetermined number of external transfer transistors that externally transfer the charge from the photoelectric conversion element to surrounding pixels among the plurality of pixels.

(5) The solid-state imaging element according to (4), wherein the charge holding portion is a capacitor.

(6) The solid-state imaging element according to (4), wherein the charge holding portion is a floating diffusion layer.

(7) The solid-state imaging element according to any one of (1) to (6), wherein the scanning circuit causes the predetermined number of adjacent pixels and the pixel of interest to start generating of the charge at different timings.

(8) The solid-state imaging element according to any one of (1) to (6), wherein the scanning circuit causes the predetermined number of adjacent pixels and the pixel of interest to start generating of the charge at the same timing.

(9) The solid-state imaging element according to any one of (1) to (8), wherein the pixel array unit is divided into a plurality of windows having a predetermined size, and each of the plurality of windows outputs a pixel signal corresponding to the statistic of the amount of the charge accumulated in each of the pixels in the window.

(10) The solid-state imaging element according to any one of (1) to (9), further including an image processing unit that performs a predetermined convolution operation on the image data output by the pixel array unit.

(11) An imaging device including: a pixel array unit in which a plurality of pixels are arranged in a two-dimensional lattice pattern; a coefficient holding unit that holds a predetermined weighting coefficient correlated with each of a pixel of interest among the plurality of pixels and a predetermined number of adjacent pixels adjacent to the pixel of interest; a scanning circuit that performs control so that the adjacent pixel generates an amount of charge corresponding to the weighting coefficient correlated with the adjacent pixel and transfers the charge to the pixel of interest and performs control so that the pixel of interest generates an amount of charge corresponding to the weighting coefficient correlated with the pixel of interest and accumulates the charge together with the transferred charge.

(12) An imaging device including: a pixel array unit in which a plurality of pixels are arranged in a two-dimensional lattice pattern; a coefficient holding unit that holds a predetermined weighting coefficient correlated with each of a pixel of interest among the plurality of pixels and a predetermined number of adjacent pixels adjacent to the pixel of interest; an actuator that changes positions of the plurality of pixels to positions different from predetermined initial positions in pixels units; and a scanning circuit that performs control so that each of the plurality of pixels at the initial positions generates an amount of charge corresponding to the weighting coefficient corresponding to the pixel of interest and performs control so that, each time the position of the pixel array unit is changed, an amount of charge corresponding to the weighting coefficient corresponding to the adjacent pixel related to the changed position is generated.

(13) A method for controlling a solid-state imaging element, including: a transfer procedure in which an adjacent pixel adjacent to a pixel of interest generates an amount of charge corresponding to a weighting coefficient correlated with the adjacent pixel and transfers the charge to the pixel of interest; and an accumulation procedure in which the pixel of interest generates an amount of charge corresponding to the weighting coefficient correlated with the pixel of interest and accumulates the charge together with the transferred charge.

REFERENCE SIGNS LIST

100 Imaging device
110 Optical unit
120 DSP (Digital Signal Processing) circuit
130 Display unit
140 Operating unit
150 Bus
160 Frame memory
170 Storage unit
180 Power supply unit
200 Solid-state imaging element
210 Row scanning circuit
220 Pixel array unit
230 Coefficient holding unit
250 DAC (Digital to Analog Converter)
260 Signal processing unit
261 Comparator
262 Counter
263 Latch
270 Timing control unit
280 Column scanning circuit
290 Image processing unit
300, 310, 320, 330, 340, 350, 360, 370, 380 Pixels
301, 311, 321, 331, 341, 351, 361, 371, 381 Photoelectric conversion elements
302, 312, 322, 332, 342, 352, 362, 372, 382, 410 to 418 Transfer transistor
303, 313, 333, 343 Capacitor
304, 314, 334, 344 Operational amplifier
305, 315, 335, 345 Reset switch
306, 316, 336, 346 Reset transistor
308, 318, 338, 348 Amplification transistor
337 Floating diffusion layer
420 Load MOS (Metal-Oxide-Semiconductor) transistor
451 Pixel shift control unit
452 Y-axis actuator
453 X-axis actuator
12031 Imaging unit

The invention claimed is:

1. A solid-state imaging element, comprising:
a pixel array unit in which a plurality of pixels is arranged in a two-dimensional lattice pattern, wherein each of the plurality of pixels includes
a photoelectric conversion element that generates a charge by photoelectric conversion;
a charge holding portion that holds the charge;
an internal transfer transistor that internally transfers the charge from the photoelectric conversion element to the charge holding portion; and
a specific number of external transfer transistors that externally transfer the charge from the photoelectric conversion element to surrounding pixels among the plurality of pixels;
a coefficient holding unit that holds a specific weighting coefficient correlated with each of a pixel of interest among the plurality of pixels and a specific number of adjacent pixels adjacent to the pixel of interest; and
a scanning circuit configured to control so that the adjacent pixel generates an amount of charge corresponding to the weighting coefficient correlated with the adjacent pixel and transfers the charge to the pixel of interest and performs control so that the pixel of interest generates an amount of charge corresponding to the weighting coefficient correlated with the pixel of interest and accumulates the charge together with the transferred charge.

2. The solid-state imaging element according to claim 1, wherein the plurality of pixels is arranged in a two-dimensional lattice pattern.

3. The solid-state imaging element according to claim 1, wherein the plurality of pixels is arranged in a honeycomb pattern.

4. The solid-state imaging element according to claim 1, wherein the charge holding portion is a capacitor.

5. The solid-state imaging element according to claim 1, wherein the charge holding portion is a floating diffusion layer.

6. The solid-state imaging element according to claim 1, wherein the scanning circuit causes the specific number of adjacent pixels and the pixel of interest to start generating of the charge at different timings.

7. The solid-state imaging element according to claim 1, wherein the scanning circuit causes the specific number of adjacent pixels and the pixel of interest to start generating of the charge at the same timing.

8. The solid-state imaging element according to claim 1, wherein the pixel array unit is divided into a plurality of windows having a specific size, and each of the plurality of windows outputs a pixel signal corresponding to statistic of the amount of the charge accumulated in each of the pixels in the window.

9. The solid-state imaging element according to claim 1, further comprising an image processing unit configured to execute a specific convolution operation on image data output by the pixel array unit.

10. An imaging device, comprising:
a pixel array unit in which a plurality of pixels is arranged in a two-dimensional lattice pattern, wherein each of the plurality of pixels includes
a photoelectric conversion element that generates a charge by photoelectric conversion;
a charge holding portion that holds the charge;
an internal transfer transistor that internally transfers the charge from the photoelectric conversion element to the charge holding portion; and
a specific number of external transfer transistors that externally transfer the charge from the photoelectric conversion element to surrounding pixels among the plurality of pixels;
a coefficient holding unit that holds a specific weighting coefficient correlated with each of a pixel of interest among the plurality of pixels and a specific number of adjacent pixels adjacent to the pixel of interest;
a scanning circuit configured to control so that the adjacent pixel generates an amount of charge corresponding to the weighting coefficient correlated with the adjacent pixel and transfers the charge to the pixel of interest and performs control so that the pixel of interest generates an amount of charge corresponding to the weighting coefficient correlated with the pixel of interest and accumulates the charge together with the transferred charge; and
an image processing unit configured to execute specific processing on image data output by the pixel array unit.

11. An imaging device, comprising:
a pixel array unit in which a plurality of pixels is arranged in a two-dimensional lattice pattern, wherein each of the plurality of pixels includes
a photoelectric conversion element that generates a charge by photoelectric conversion;
a charge holding portion that holds the charge;
an internal transfer transistor that internally transfers the charge from the photoelectric conversion element to the charge holding portion; and
a specific number of external transfer transistors that externally transfer the charge from the photoelectric conversion element to surrounding pixels among the plurality of pixels;
a coefficient holding unit that holds a specific weighting coefficient correlated with each of a pixel of interest among the plurality of pixels and a specific number of adjacent pixels adjacent to the pixel of interest;
an actuator configured to change positions of the plurality of pixels to positions different from specific initial positions in pixels units; and
a scanning circuit configured to control so that each of the plurality of pixels at the initial positions generates an amount of charge corresponding to the weighting coefficient corresponding to the pixel of interest and performs control so that, each time the position of the pixel array unit is changed, an amount of charge corresponding to the weighting coefficient corresponding to the adjacent pixel related to the changed position is generated.

12. A method for controlling a solid-state imaging element, comprising:
a transfer procedure in which an adjacent pixel adjacent to a pixel of interest generates an amount of charge corresponding to a weighting coefficient correlated with the adjacent pixel and transfers the charge to the pixel of interest, wherein, each adjacent pixel includes
a photoelectric conversion element that generates a charge by photoelectric conversion;
a charge holding portion that holds the charge;
an internal transfer transistor that internally transfers the charge from the photoelectric conversion element to the charge holding portion; and
a specific number of external transfer transistors that externally transfer the charge from the photoelectric conversion element to surrounding pixels; and
an accumulation procedure in which the pixel of interest generates an amount of charge corresponding to the weighting coefficient correlated with the pixel of interest and accumulates the charge together with the transferred charge.

* * * * *